United States Patent
Miyamoto et al.

(10) Patent No.: US 10,407,864 B2
(45) Date of Patent: Sep. 10, 2019

(54) WORK VEHICLE AND CONTROL METHOD FOR SAME

(71) Applicant: KOMATSU LTD., Tokyo (JP)

(72) Inventors: Shunsuke Miyamoto, Atsugi (JP); Hiroshi Monden, Hiratsuka (JP); Hikosaburou Hiraki, Oyama (JP); Yasuo Fujiwara, Hiratsuka (JP); Yasunori Ohkura, Kawasaki (JP)

(73) Assignee: KOMATSU LTD., Tokyo (JP)

( * ) Notice: Subject to any disclaimer, the term of this patent is extended or adjusted under 35 U.S.C. 154(b) by 396 days.

(21) Appl. No.: 14/653,485

(22) PCT Filed: Jun. 25, 2014

(86) PCT No.: PCT/JP2014/066883
§ 371 (c)(1),
(2) Date: Jun. 18, 2015

(87) PCT Pub. No.: WO2014/208616
PCT Pub. Date: Dec. 31, 2014

(65) Prior Publication Data
US 2015/0322645 A1   Nov. 12, 2015

(30) Foreign Application Priority Data

Jun. 28, 2013 (JP) ................. 2013-136243

(51) Int. Cl.
*E02F 3/28* (2006.01)
*E02F 9/20* (2006.01)
(Continued)

(52) U.S. Cl.
CPC .............. *E02F 3/283* (2013.01); *B60K 6/365* (2013.01); *B60K 6/387* (2013.01); *B60K 6/445* (2013.01);
(Continued)

(58) Field of Classification Search
CPC .................. E02F 3/283; Y02T 10/84
(Continued)

(56) References Cited

U.S. PATENT DOCUMENTS 5,193,416 A    3/1993  Kanayama
6,865,470 B2*  3/2005  Ohtsu ............... B60K 23/0808
                                                180/197

(Continued)

FOREIGN PATENT DOCUMENTS

CN    101542048 A    9/2009
CN    102458947 A    5/2012
(Continued)

OTHER PUBLICATIONS

The International Search Report for the corresponding international application No. PCT/JP2014/066883, dated Sep. 2, 2014.
(Continued)

*Primary Examiner* — Jacob S. Scott
*Assistant Examiner* — Michael E Butler
(74) *Attorney, Agent, or Firm* — Global IP Counselors, LLP

(57) ABSTRACT

The work implement requirement determination unit determines a work implement required horsepower on the basis of an operation amount of a work implement operating member and a hydraulic pressure of a hydraulic pump. A transmission requirement determination unit determines a transmission required horsepower on the basis of a vehicle speed and the operation amount of the accelerator operating member. An engine requirement determination unit determines an engine required horsepower on the basis of the work implement required horsepower and the transmission required horsepower. The required throttle determination unit determines a required throttle value based on an engine requirement.

15 Claims, 17 Drawing Sheets

(51) Int. Cl.
*B60K 6/485* (2007.10)
*B60W 10/115* (2012.01)
*E02F 3/42* (2006.01)
*B60W 10/06* (2006.01)
*B60W 10/26* (2006.01)
*B60L 15/20* (2006.01)
*B60W 10/08* (2006.01)
*B60W 20/00* (2016.01)
*F16H 3/66* (2006.01)
*B60K 6/365* (2007.10)
*B60K 6/387* (2007.10)
*B60K 6/445* (2007.10)
*B60W 50/00* (2006.01)
*B60W 20/11* (2016.01)
*B60L 50/40* (2019.01)
*B60L 50/62* (2019.01)
*B60L 50/16* (2019.01)
*B60K 6/38* (2007.10)
*B60W 30/18* (2012.01)
*B60W 30/188* (2012.01)

(52) U.S. Cl.
CPC .............. *B60K 6/485* (2013.01); *B60L 15/20* (2013.01); *B60L 15/2054* (2013.01); *B60L 50/16* (2019.02); *B60L 50/40* (2019.02); *B60L 50/62* (2019.02); *B60W 10/06* (2013.01); *B60W 10/08* (2013.01); *B60W 10/115* (2013.01); *B60W 10/26* (2013.01); *B60W 20/00* (2013.01); *B60W 20/11* (2016.01); *B60W 50/0097* (2013.01); *E02F 3/422* (2013.01); *E02F 9/2075* (2013.01); *E02F 9/2079* (2013.01); *E02F 9/2091* (2013.01); *F16H 3/66* (2013.01); *B60K 2006/381* (2013.01); *B60L 2200/40* (2013.01); *B60L 2220/42* (2013.01); *B60L 2240/423* (2013.01); *B60W 30/1884* (2013.01); *B60W 30/18127* (2013.01); *B60W 2300/17* (2013.01); *B60W 2510/1005* (2013.01); *B60W 2520/10* (2013.01); *B60W 2540/10* (2013.01); *B60W 2540/12* (2013.01); *B60W 2710/0666* (2013.01); *B60W 2710/0677* (2013.01); *B60W 2710/083* (2013.01); *B60W 2710/105* (2013.01); *B60Y 2200/411* (2013.01); *F16H 2200/2007* (2013.01); *Y02T 10/6217* (2013.01); *Y02T 10/6239* (2013.01); *Y02T 10/6291* (2013.01); *Y02T 10/645* (2013.01); *Y02T 10/646* (2013.01); *Y02T 10/7022* (2013.01); *Y02T 10/7077* (2013.01); *Y02T 10/72* (2013.01); *Y02T 10/7275* (2013.01); *Y02T 10/84* (2013.01); *Y10S 903/93* (2013.01); *Y10S 903/945* (2013.01)

(58) Field of Classification Search
USPC .......................................................... 701/50
See application file for complete search history.

(56) References Cited

U.S. PATENT DOCUMENTS

| | | | |
|---|---|---|---|
| 7,832,520 B2 | 11/2010 | Murakami et al. | |
| 9,145,127 B2* | 9/2015 | Uematsu | B60T 8/175 |
| 9,267,269 B2 | 2/2016 | Miyamoto et al. | |
| 2001/0021683 A1 | 9/2001 | Takagi et al. | |
| 2001/0049570 A1 | 12/2001 | Yamaguchi et al. | |
| 2004/0222000 A1 | 11/2004 | Ohtsukasa | |
| 2005/0071068 A1 | 3/2005 | Funato et al. | |
| 2005/0082992 A1 | 4/2005 | Aizawa et al. | |
| 2005/0227809 A1 | 10/2005 | Bitzer et al. | |
| 2006/0006734 A1 | 1/2006 | Tabata et al. | |
| 2006/0183581 A1 | 8/2006 | Iwatsuki et al. | |
| 2007/0213175 A1 | 9/2007 | Kuwahara et al. | |
| 2009/0105028 A1 | 4/2009 | Hiraki et al. | |
| 2009/0112415 A1 | 4/2009 | Hendryx | |
| 2009/0265065 A1* | 10/2009 | Ikari | E02F 9/2292 701/50 |
| 2010/0036568 A1 | 2/2010 | Filla | |
| 2010/0089050 A1 | 4/2010 | Filla | |
| 2010/0256877 A1 | 10/2010 | Nakagawa et al. | |
| 2011/0092334 A1* | 4/2011 | Baino | B60K 6/387 477/5 |
| 2011/0178684 A1 | 7/2011 | Umemoto et al. | |
| 2011/0230296 A1* | 9/2011 | Hiraki | B60K 6/445 475/151 |
| 2012/0004797 A1 | 1/2012 | Baino et al. | |
| 2012/0072065 A1* | 3/2012 | Minamikawa | B60K 6/365 701/22 |
| 2013/0041561 A1 | 2/2013 | Asami et al. | |
| 2013/0168179 A1* | 7/2013 | Will | F16H 61/4017 180/338 |
| 2015/0337877 A1 | 11/2015 | Miyamoto et al. | |
| 2016/0017557 A1 | 1/2016 | Miyamoto et al. | |
| 2016/0024754 A1 | 1/2016 | Miyamoto et al. | |

FOREIGN PATENT DOCUMENTS

| | | |
|---|---|---|
| EP | 2 055 544 A2 | 5/2009 |
| EP | 2 568 148 A1 | 3/2013 |
| JP | 11-108175 A | 4/1999 |
| JP | 2001-339805 A | 12/2001 |
| JP | 2002-281607 A | 9/2002 |
| JP | 2004-100621 A | 4/2004 |
| JP | 2006-205777 A | 8/2006 |
| JP | 2006-329244 A | 12/2006 |
| JP | 2007-40301 A | 2/2007 |
| JP | 2007-503356 A | 2/2007 |
| JP | 2008-247269 A | 10/2008 |
| JP | 2011-245948 A | 5/2010 |
| JP | 2010-188800 A | 9/2010 |
| JP | 2012-110089 A | 6/2012 |
| JP | 2012-153174 A | 8/2012 |
| JP | 2013-108437 A | 6/2013 |
| WO | 2006/126368 A1 | 11/2006 |

OTHER PUBLICATIONS

The Office Action for the related Chinese application No. 201480003591.6, dated Nov. 23, 2016.

The extended European search report for the related European application No. 14816919.6, dated May 17, 2016.

The Office Action for the related U.S. Appl. No. 14/653,384 dated Mar. 9, 2016.

The extended European Search Report for the related European application No. 14817157.2, dated Jul. 7, 2016.

The extended European search report for the corresponding European application No. 14817454.3, dated Sep. 23, 2016.

Office Action for the corresponding Japanese application No. 2015-524092, dated Oct. 2, 2018.

* cited by examiner

WORK VEHICLE AND CONTROL METHOD FOR SAME

CROSS-REFERENCE TO RELATED APPLICATIONS

This application is a U.S. National stage application of International Application No. PCT/JP2014/066883, filed on Jun. 25, 2014. This U.S. National stage application claims priority under 35 U.S.C. § 119(a) to Japanese Patent Application No. 2013-136243, filed in Japan on Jun. 28, 2013, the entire contents of which are hereby incorporated herein by reference.

BACKGROUND

Field of the Invention

The present invention relates to a work vehicle and a control method therefor.

Background Information

A power-transmission device (referred to hereinbelow as a "torque converter-type transmission") having a torque converter and a multi-stage speed change gear is well known as a work vehicle such as a wheel loader. However, recently hydraulic mechanical transmissions (HMT) have become known as power-transmission devices in place of torque converter-type transmissions. As disclosed in Japanese Laid-Open Patent Publication No. 2006-329244, an HMT has a gear mechanism and a motor connected to rotation elements of the gear mechanism, and a portion of the driving power from the engine is converted to hydraulic pressure and transmitted to a travel device, and the remaining portion of the driving power is mechanically transmitted to the travel device.

The HMT is provided with a planetary gear mechanism and a hydraulic motor, for example, in order to allow stepless speed variation. A first element among the three elements of a sun gear, a carrier, and a ring gear of the planetary gear mechanism is coupled to an input shaft, and the second element is coupled to an output shaft. The third element is coupled to the hydraulic motor. The hydraulic motor functions as either a motor or a pump in response to the travel state of the work vehicle. The HMT is configured to enable stepless changing of the rotation speed of the output shaft by changing the rotation speed of the hydraulic motor.

Further as described in Japanese Laid-Open Patent Publication No. 2008-247269, an electric-mechanical transmission device (EMT) has been proposed as a technique similar to the HMT. An electric motor is used in the EMT in place of the hydraulic motor in the HMT. The electric motor functions as either a motor or a generator in response to the travel state of the work vehicle. Similar to the HMT, the EMT is configured to enable stepless changing of the rotation speed of the output shaft by changing the rotation speed of the electric motor.

SUMMARY

Japanese Laid-Open Patent Publication No. 2008-247269 discloses the determination of an engine torque command according to a loading engine torque command based on an operation of a work implement and a travel torque command based on an accelerator operation. However, a torque required for the work implement is not determined merely from the operation of the work implement but also is affected by load that the work implement receives. Therefore in Japanese Laid-Open Patent Publication No. 2008-247269, the engine torque command cannot be determined by taking into consideration the load actually received by the work implement. As a result, an engine output suited to driving the work implement and driving the travel device cannot be achieved.

An object of the present invention is to achieve an engine output suited to driving the work implement and driving the travel device in a hybrid work vehicle provided with a transmission, such as an EMT or a HMT.

A work vehicle according to a first exemplary embodiment of the present invention is equipped with an engine, a hydraulic pump, a work implement, a work implement operating member for operating the work implement, a pressure sensor, a travel device, a power-transmission device, a vehicle speed detecting unit, an accelerator operating member, an accelerator operation detecting unit, and a control unit. The hydraulic pump is driven by the engine. The work implement is driven by hydraulic fluid discharged from the hydraulic pump. The pressure sensor detects a hydraulic pressure of the hydraulic pump. The travel device is driven by the engine. The power-transmission device transmits driving power from the engine to the travel device. The vehicle speed detecting unit detects the vehicle speed. The accelerator operation detecting unit detects an operation amount of the accelerator operating member. The control unit controls the power-transmission device. The power-transmission device has an input shaft, an output shaft, a gear mechanism, and a motor. The gear mechanism includes a planetary gear mechanism and transmits the rotations of the input shaft to the output shaft. The motor is connected to a rotating element of the planetary gear mechanisms. The power-transmission device is configured to change the rotation speed ratio of the output shaft with respect to the input shaft by changing the rotation speed of the motor.

The control unit has a work implement requirement determination unit, a transmission requirement determination unit, an engine requirement determination unit, and a required throttle determination unit. The work implement requirement determination unit determines a work implement required horsepower on the basis of an operation amount of the work implement operating member and the hydraulic pressure of the hydraulic pump. A transmission requirement determination unit determines a transmission required horsepower on the basis of the vehicle speed and the operation amount of the accelerator operating member. The engine requirement determination unit determines an engine required horsepower on the basis of the work implement required horsepower and the transmission required horsepower. The required throttle determination unit determines a required throttle value based on an engine requirement.

The work implement required horsepower is determined on the basis of the operation amount of the work implement operating member and the hydraulic pressure of the hydraulic pump in the work vehicle according to the present exemplary embodiment. The hydraulic pressure of the hydraulic pump changes in response to a load on the work implement. As a result, the work implement required horsepower can be determined in response to the load on the work implement by taking into consideration the hydraulic pressure on the hydraulic pump when determining the work implement required horsepower. The engine required horsepower is then determined on the basis of the work implement required horsepower and the transmission required horsepower. As a result, an engine horsepower can be achieved that is suited to driving the work implement in response to the operation of the work implement by the operator and the load on the work implement, and suited to driving the travel device.

The control unit preferably further has a target-input-torque determination unit, a target-output-torque determination unit, a storage unit, and a command-torque determination unit. The target-input-torque determination unit determines a target input torque. The target input torque is a target value for the torque to be inputted to the power-transmission device. The target-output-torque determination unit determines a target output torque. The target output torque is a target value for the torque to be outputted from the power-transmission device. The storage unit stores torque-balance information. The torque-balance information prescribes a relationship between the target input torque and the target output torque so as to achieve a balance of the torques of the power-transmission device. The command-torque determination unit uses the torque-balance information to determine a command torque to the motor from the target input torque and the target output torque.

A desired input torque for the power-transmission device and a desired output torque from the power-transmission device can be achieved in the work vehicle by determining the command torque to the motor from the balance of the torques of the power-transmission device. As a result, predetermined tractive force characteristics can be achieved accurately. The tractive force characteristics can be changed easily by changing the target input torque and the target output torque. As a result, a high degree of freedom for setting the tractive force characteristics is achieved.

The transmission requirement determination unit preferably determines a required tractive force on the basis of the vehicle speed and the operation amount of the accelerator operating member. The target-output-torque determination unit determines the target output torque on the basis of the required tractive force.

In this case, the required tractive force is determined on the basis of the operation amount of the accelerator operating member in addition to the vehicle speed. That is, the target output torque is determined in response to the operation of the accelerator operating member by the operator. As a result, the operational feeling of the operator can be improved.

The transmission requirement determination unit preferably determines the required tractive force from the vehicle speed on the basis of required tractive force characteristics. The required tractive force characteristics define a relationship between the vehicle speed and the required tractive force. The transmission requirement determination unit determines the required tractive force characteristics in response to the operation amount of the accelerator operating member. In this case, the operational feeling of the operator can be improved because the required tractive force characteristics are determined in response to the operation of the accelerator operating member by the operator.

The transmission requirement determination unit preferably determines the required tractive force characteristics by multiplying the basic required tractive force characteristics by a tractive force ratio and a vehicle speed ratio. The transmission requirement determination unit determines the tractive force ratio and the vehicle speed ratio in response to the operation amount of the accelerator operating member. In this case, the required tractive force characteristics can be determined in response to the operation amount of the accelerator operating member by using the tractive force ratio and the vehicle speed ratio in response to the operation amount of the accelerator operating member.

The work vehicle is preferably further provided with a speed change operating member. The transmission requirement determination unit selects the above mentioned basic required tractive force characteristics in response to an operation of the speed change operating member. In this case, the desired tractive force characteristics can be selected according to the operation of the speed change operating member.

The required tractive force characteristics preferably define a required tractive force that is a negative value with respect to a vehicle speed that is equal to or greater than a predetermined speed. In this case, the required tractive force becomes a negative value when the vehicle speed is equal to or greater than the predetermined speed. That is, when the vehicle speed is high, the power-transmission device is controlled so as to generate a braking force.

The work vehicle is preferably further provided with an energy reservoir unit. The energy reservoir unit stores energy generated in the motor. The control unit further has an energy management requirement determination unit. The energy management requirement determination unit determines an energy management required horsepower on the basis of a remaining amount of energy in the energy reservoir unit. The target-input-torque determination unit determines the target input torque on the basis of the transmission required horsepower and the energy management required horsepower.

In this case, the target input torque can be determined to obtain the transmission required horsepower required for outputting a tractive force corresponding to the required tractive force from the power-transmission device, and the energy management required horsepower required for storing energy in the energy reservoir unit.

The engine requirement determination unit preferably determines the engine required horsepower on the basis of the work implement required horsepower, the transmission required horsepower, and the energy management required horsepower. The target-input-torque determination unit determines an upper limit of the target input torque from an upper target input torque line and the engine rotation speed. The upper target input torque line defines, as the upper limit of the target input torque, a value that is less than the target output torque of the engine determined from the engine required horsepower and the engine rotation speed.

In this case, a value less than target output torque of the engine determined from the engine required horsepower and the engine rotation speed becomes the upper limit of the target input torque. As a result, the target input torque to the power-transmission device is determined so that excess torque for increasing the engine rotation speed remains. As a result, a decrease in the engine rotation speed due to overloading can be suppressed.

The control unit preferably further has a distribution ratio determination unit. The distribution ratio determination unit determines a transmission output ratio. The distribution ratio determination unit sets a value less than one as the transmission output ratio when the total of the work implement required horsepower, the transmission required horsepower, and the energy management required horsepower is larger than a predetermined load upper limit horsepower. The target-input-torque determination unit determines the target input torque on the basis of the energy management required horsepower and a value derived by multiplying the transmission required horsepower by the transmission output ratio.

In this case, while the value of the transmission required horsepower is reduced when determining the target input torque when the total of the work implement required horsepower, the transmission required horsepower, and the energy management required horsepower is larger than the predetermined load upper limit horsepower, the value of the energy management required horsepower is maintained. That is, the energy management required horsepower is prioritized more than the transmission required horsepower when determining the target input torque. Consequently, the energy management required horsepower is prioritized and the output horsepower of the engine can be distributed, and as a result a predetermined amount of energy can be ensured in the energy reservoir unit.

The target-output-torque determination unit preferably determines the target output torque on the basis of a value derived by multiplying the required tractive force by the transmission output ratio. In this case, the energy management required horsepower is prioritized more than the required tractive force when determining the target output torque. As a result, a predetermined amount of energy can be ensured in the energy reservoir unit.

The storage unit preferably stores an engine torque line and a matching line. The engine torque line defines a relationship between the engine output torque and the engine rotation speed. The matching line is information for determining the required throttle value from the engine required horsepower.

The engine torque line includes a regulation region and a full load region. The regulation region changes in response to the required throttle value. The full load region includes a rated point and a maximum torque point located on the low engine rotation speed side from the rated point. The required throttle determination unit determines the required throttle value so that the engine torque line and the matching line coincide at a matching point where the output torque of the engine becomes the torque corresponding to the engine required horsepower. The matching line is set to pass through a position closer to the maximum torque point than the rated point in the full load region of the engine torque line.

In this case, the engine rotation speed at the matching point is reduced in comparison to when the matching line is set to pass through a location closer to the rated point than the maximum torque point in the full load region. As a result, the fuel consumption can be improved.

The work vehicle is preferably further provided with an energy reservoir unit. The energy reservoir unit stores energy generated in the motor. The control unit further has an energy management requirement determination unit. The energy management requirement determination unit determines an energy management required horsepower on the basis of a remaining amount of energy in the energy reservoir unit. The engine requirement determination unit determines an engine required horsepower on the basis of the work implement required horsepower, the transmission required horsepower, and the energy management required horsepower.

In this case, an engine required horsepower can be determined that is suited for driving the work implement and driving the travel device in response to the operation of each of the operating members by the operator, and suited to the storage of energy in the energy reservoir unit.

The power-transmission device preferably further includes a mode-switching mechanism. The mode-switching mechanism selectively switches the drive-power transmission path of the power-transmission device among a plurality of modes. The plurality of modes includes a first mode and a second mode. The command-torque determination unit determines a command torque for the motor from first torque-balance information in the first mode. The command-torque determination unit determines a command torque for the motor from second torque-balance information in the second mode. In this case, the command-torque determination unit is able to determine a command torque suited for the selected mode.

A control method according to a second embodiment of the present invention is a control method for a work vehicle. The work vehicle is provided with a power-transmission device. The power-transmission device has an input shaft, an output shaft, a gear mechanism, and a motor. The gear mechanism includes a planetary gear mechanism and transmits the rotations of the input shaft to the output shaft. The motor is connected to a rotating element of the planetary gear mechanisms. The power-transmission device is configured to change the rotation speed ratio of the output shaft with respect to the input shaft by changing the rotation speed of the motor. The control method according to the present exemplary embodiment includes the following steps. A first step involves detecting an operation amount of a work implement operating member. A second step involves detecting a hydraulic pressure of a hydraulic pump for driving a work implement. A third step involves detecting the vehicle speed. A fourth step involves detecting the operation amount of the accelerator operating member. A fifth step involves determining a work implement required horsepower on the basis of the operation amount of the work implement operating member and the hydraulic pressure. A sixth step involves determining a transmission required horsepower on the basis of the vehicle speed and the operation amount of the accelerator operating member. A seventh step involves determining an engine required horsepower on the basis of the work implement required horsepower and the transmission required horsepower. An eighth step involves determining a required throttle value based on the engine required horsepower.

The work implement required horsepower is determined on the basis of the operation amount of the work implement operating member and the hydraulic pressure of the hydraulic pump in the control method according to the present exemplary embodiment. The hydraulic pressure of the hydraulic pump changes in response to a load on the work implement. As a result, the work implement required horsepower can be determined in response to the load on the work implement by taking into consideration the hydraulic pressure on the hydraulic pump in the determination of the work implement required horsepower. The engine required horsepower is then determined on the basis of the work implement required horsepower and the transmission required horsepower. As a result, an engine horsepower can be achieved that is suited to driving the work implement corresponding to the operation of the work implement by the operator and the load on the work implement, and suited to driving the travel device.

According to the present exemplary invention, an engine output suited to driving the work implement and driving the travel device can be achieved in a hybrid work vehicle.

DETAILED DESCRIPTION OF EXEMPLARY EMBODIMENTS

Figure 1:
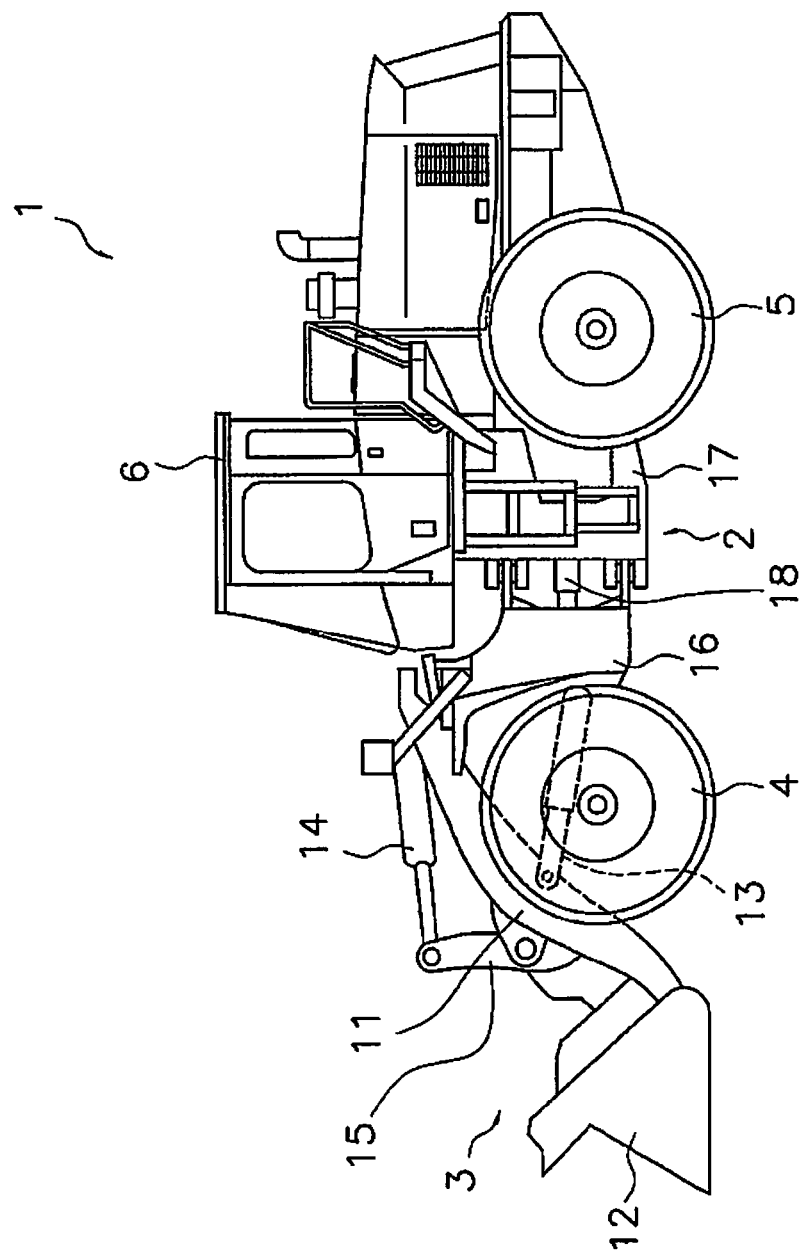
FIG. 1 is a side view of a work vehicle according to an exemplary embodiment of the present invention.

Exemplary embodiments of the present invention will be explained in detail with reference to the figures. FIG. 1 is a side view of a work vehicle 1 according to an exemplary embodiment of the present invention. As illustrated in FIG. 1, the work vehicle 1 is equipped with a vehicle body frame 2, a work implement 3, traveling wheels 4 and 5, and an operating cabin 6. The work vehicle 1 is a wheel loader and travels due to the traveling wheels 4 and 5 being rotated and driven. The work vehicle 1 is able to carry out work such as excavation by using the work implement 3.

The work implement 3 and the traveling wheels 4 are attached to the vehicle body frame 2. The work implement 3 is driven by hydraulic fluid from a below mentioned work implement pump 23 (see FIG. 2). The work implement 3 has a boom 11 and a bucket 12. The boom 11 is mounted on the vehicle body frame 2. The work implement 3 includes a lift cylinder 13 and a bucket cylinder 14. The lift cylinder 13 and the bucket cylinder 14 are hydraulic cylinders. One end of the lift cylinder 13 is attached to the vehicle body frame 2. The other end of the lift cylinder 13 is attached to the boom 11. The boom 11 swings up and down due to the extension and contraction of the lift cylinder 13 due to hydraulic fluid from the work implement pump 23. The bucket 12 is attached to the tip of the boom 11. One end of the bucket cylinder 14 is attached to the vehicle body frame 2. The other end of the bucket cylinder 14 is attached to the bucket 12 via a bell crank 15. The bucket 12 swings up and down due to the extension and contraction of the bucket cylinder 14 due to hydraulic fluid from the work implement pump 23.

The operating cabin 6 and the traveling wheels 5 are attached to the vehicle body frame 2. The operating cabin 6 is mounted on the vehicle body frame 2. A seat for the operator and a below mentioned operating device are disposed in the operating cabin 6. The vehicle body frame 2 has a front frame 16 and a rear frame 17. The front frame 16 and the rear frame 17 are attached to each other in a manner that allows swinging in the left-right direction.

The work vehicle 1 has a steering cylinder 18. The steering cylinder 18 is attached to the front frame 16 and the rear frame 17. The steering cylinder 18 is a hydraulic cylinder. The work vehicle 1 is able to change the advancing direction to the right and left with the extension and contraction of the steering cylinder 18 due to hydraulic fluid from a below mentioned steering pump 30 (FIG. 2).

Figure 2:
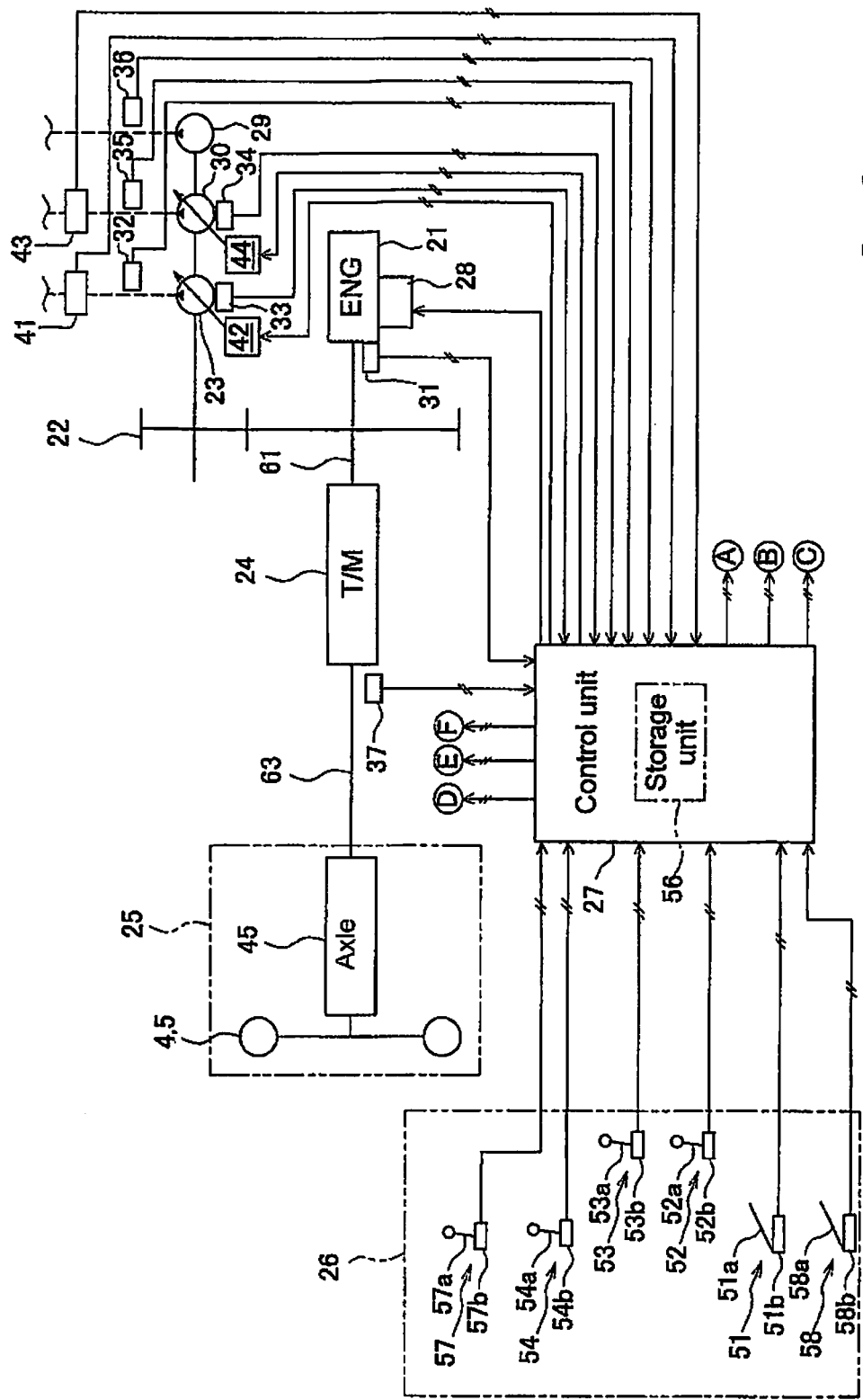
FIG. 2 is a schematic view of a configuration of the work vehicle.

FIG. 2 is a schematic view of a configuration of the work vehicle 1. As illustrated in FIG. 2, the work vehicle 1 is equipped with an engine 21, a PTO (power take-off) 22, a power-transmission device 24, a travel device 25, an operating device 26, and a control unit 27.

The engine 21 is, for example, a diesel engine. The output of the engine 21 is controlled by adjusting the amount of fuel injected into the cylinders of the engine 21. The adjustment of the amount of fuel is conducted by the control unit 27 controlling a fuel injection device 28 attached to the engine 21. The work vehicle 1 is equipped with an engine rotation speed detecting unit 31. The engine rotation speed detecting unit 31 detects the engine rotation speed and transmits a detection signal indicating the engine rotation speed to the control unit 27.

The work vehicle 1 has the work implement pump 23, the steering pump 30, and a transmission pump 29. The work implement pump 23, the steering pump 30, and the transmission pump 29 are hydraulic pumps. The PTO 22 (power take-off) transmits a portion of the driving power from the engine 21 to the hydraulic pumps 23, 30, and 29. That is, the PTO 22 distributes the driving power from the engine 21 to the power-transmission device 24 and to the hydraulic pumps 23, 30, and 29.

The work implement pump 23 is driven by driving power from the engine 21. The hydraulic fluid discharged from the work implement pump 23 is supplied to the lift cylinder 13 and the bucket cylinder 14 above mentioned through a work implement control valve 41. The work implement control valve 41 changes the flow rate of the hydraulic fluid supplied to the lift cylinder 13 and to the bucket cylinder 14 in response to an operation of a below mentioned work implement operating member 52a. The work vehicle 1 is equipped with a work implement pump pressure detecting unit 32. The work implement pump pressure detecting unit 32 detects a discharge pressure (referred to below as "work implement pump pressure") of hydraulic fluid from the work implement pump 23 and transmits a detection signal indicating the work implement pump pressure to the control unit 27.

The work implement pump 23 is a variable displacement hydraulic pump. The discharge capacity of the work implement pump 23 is changed by changing the tilt angle of a skew plate or an inclined shaft of the work implement pump 23. A first capacity control device 42 is connected to the work implement pump 23. The first capacity control device 42 is controlled by the control unit 27 and changes the tilt angle of the work implement pump 23. As a result, the discharge capacity of the work implement pump 23 is controlled by the control unit 27. For example, the first capacity control device 42 adjusts the tilt angle of the work implement pump 23 so that a differential pressure between the front and the rear of the work implement control valve 41 is fixed. The first capacity control device 42 also optionally changes the tilt angle of the work implement pump 23 in response to a command signal from the control unit 27. Specifically, the first capacity control device 42 includes a first valve and a second valve (not illustrated). When the hydraulic fluid supplied to the work implement 3 is changed due to the above mentioned work implement control valve 41, a differential pressure is generated between the discharge pressure of the work implement pump 23 and the pressure after passing through the work implement control valve 41 in response to the change in the opening degree of the work implement control valve 41. The first valve is controlled by the control unit 27 to adjust the tilt angle of the work implement pump 23 so that the differential pressure between the front and rear of the work implement control valve 41 is fixed even if the load on the work implement 3 fluctuates. The second valve is controlled by the control unit 27 to be able to further change the tilt angle of the work implement pump 23. The work vehicle 1 is equipped with a first tilt angle detecting part 33. The first tilt angle detecting part 33 detects the tilt angle of the work implement pump 23 and transmits a detection signal indicating the tilt angle to the control unit 27.

The steering pump 30 is driven by driving power from the engine 21. The hydraulic fluid discharged from the steering pump 30 is supplied to the above mentioned steering cylinder 18 through a steering control valve 43. The work vehicle 1 is equipped with a steering pump pressure detecting unit 34. The steering pump pressure detecting unit 34 detects the discharge pressure (referred to below as "steering pump pressure") of hydraulic fluid from the steering pump 30 and transmits a detection signal indicating the steering pump pressure to the control unit 27.

The steering pump 30 is a variable displacement hydraulic pump. The discharge capacity of the steering pump 30 is changed by changing the tilt angle of a skew plate or an inclined shaft of the steering pump 30. A second capacity control device 44 is connected to the steering pump 30. The second capacity control device 44 is controlled by the control unit 27 and changes the tilt angle of the steering pump 30. As a result, the discharge capacity of the steering pump 30 is controlled by the control unit 27. The work vehicle 1 is equipped with a second tilt angle detecting part 35. The second tilt angle detecting part 35 detects the tilt angle of the steering pump 30 and transmits a detection signal indicating the tilt angle to the control unit 27.

The transmission pump 29 is driven by driving power from the engine 21. The transmission pump 29 is a fixed displacement hydraulic pump. Hydraulic fluid discharged from the transmission pump 29 is supplied to clutches CF, CR, CL, and CH of the power-transmission device 24 via below mentioned clutch control valves VF, VR, VL, and VH. The work vehicle 1 is equipped with a transmission pump pressure detecting unit 36. The transmission pump pressure detecting unit 36 detects the discharge pressure (referred to below as "transmission pump pressure") of the hydraulic fluid from the transmission pump 29 and transmits a detection signal indicating the transmission pump pressure to the control unit 27.

The PTO 22 transmits a portion of the driving power from the engine 21 to the power-transmission device 24. The power-transmission device 24 transmits the driving power from the engine 21 to the travel device 25. The power-transmission device 24 changes the speed and outputs the driving power from the engine 21. An explanation of the configuration of the power-transmission device 24 is provided in detail below.

The travel device 25 has an axle 45 and the traveling wheels 4 and 5. The axle 45 transmits driving power from the power-transmission device 24 to the traveling wheels 4 and 5. As a result, the traveling wheels 4 and 5 rotate. The work vehicle 1 is equipped with a vehicle speed detecting unit 37. The vehicle speed detecting unit 37 detects the rotation speed (referred to below as "output rotation speed") of an output shaft 63 of the power-transmission device 24. The output rotation speed corresponds to the vehicle speed and consequently the vehicle speed detecting unit 37 detects the vehicle speed by detecting the output rotation speed. The vehicle speed detecting unit 37 detects the rotating direction of the output shaft 63. The rotating direction of the output shaft 63 corresponds to the traveling direction of the work vehicle 1 and consequently the vehicle speed detecting unit 37 detects the traveling direction of the work vehicle 1 by detecting the rotating direction of the output shaft 63. The vehicle speed detecting unit 37 transmits detection signals indicating the output rotation speed and the rotating direction to the control unit 27.

The operating device 26 is operated by the operator. The operating device 26 has an accelerator operating device 51, a work implement operating device 52, a speed change operating device 53, an FR operating device 54, a steering operating device 57, and a brake operating device 58.

The accelerator operating device 51 has an accelerator operating member 51a and an accelerator operation detecting unit 51b. The accelerator operating member 51a is operated to set a target rotation speed of the engine 21. The accelerator operation detecting unit 51b detects an operation amount (referred to below as "accelerator operating amount") of the accelerator operating member 51a. The accelerator operation detecting unit 51b transmits a detection signal indicating the accelerator operation amount to the control unit 27.

The work implement operating device 52 has a work implement operating member 52a and a work implement operation detecting unit 52b. The work implement operating member 52a is operated in order to actuate the work implement 3. The work implement operation detecting unit 52b detects a position of the work implement operating member 52a. The work implement operation detecting unit 52b outputs a detection signal indicating the position of the work implement operating member 52a to the control unit 27. The work implement operation detecting unit 52b detects an operation amount (referred to below as "boom operation amount") of the work implement operating member 52a for operating the boom 11 and an operation amount (referred to below as "bucket operation amount") of the work implement operating member 52a for operating the bucket 14, by detecting the position of the work implement operating member 52a. The work implement operating member 52 is configured for example with one lever and the operation of the boom 11 and the operation of the bucket 14 may be assigned to each operating direction of the lever. Alternatively, the work implement operating member 52 is configured for example with two levers and the operation of the boom 11 and the operation of the bucket 14 may be assigned to each lever.

The speed change operating device 53 has a speed change operating member 53a and a speed change operation detecting unit 53b. The operator is able to select a speed range of the power-transmission device 24 by operating the speed change operating member 53a. The speed change operation detecting unit 53b detects a position of the speed change operating member 53a. The position of the speed change operating member 53a corresponds to a plurality of speed ranges such as a first speed and a second speed and the like. The speed change operation detecting unit 53b outputs a detection signal indicating the position of the speed change operating member 53a to the control unit 27.

The FR operating device 54 has an FR operating member 54a and a FR operation detecting unit 54b. The operator can switch between forward and reverse movement of the work vehicle 1 by operating the FR operating member 54a. The FR operating member 54a is selectively switched between a forward movement position (F), a neutral position (N), and a reverse movement position (R). The FR operation detecting unit 54b detects a position of the FR operating member 54a. The FR operation detecting unit 54b outputs a detection signal indicating the position of the FR operating member 54a to the control unit 27.

The steering operating device 57 has a steering operating member 57a and a steering operation detecting unit 57b. The operator is able to change the travel direction of the work vehicle 1 to the right or left by operating the steering operating member 57a. The steering operation detecting unit 57b detects a position of the steering operating member 57a. The steering operation detecting unit 57h outputs a detection signal indicating the position of the steering operating member 57a to the control unit 27.

The brake operating device 58 has a brake operating member 58a and a brake operation detecting unit 58b. The operator actuates a brake device (not illustrated) to generate a braking force on the work vehicle 1 by operating the brake operating member 58a. The brake operation detecting unit 58b detects a position of the brake operating member 58a. The brake operation detecting unit 58b outputs a detection signal indicating the position of the brake operating member 58a to the control unit 27.

The control unit 27 has a calculation device such as a CPU and a memory such as a RAM or a ROM, and conducts various types of processing for controlling the work vehicle 1. The control unit 27 has the storage unit 56. The storage unit 56 stores various types of programs and data for controlling the work vehicle 1.

The control unit 27 transmits a command signal indicating a command throttle value to the fuel injection device 28 to achieve the target rotation speed of the engine 21 in response to the accelerator operation amount. The control of the engine 21 by the control unit 27 is described in detail below.

The control unit 27 controls hydraulic pressure of the hydraulic fluid supplied to the hydraulic cylinders 13 and 14 by controlling the work implement control valve 41 on the basis of the detection signals from the work implement operation detecting unit 52b. As a result, the hydraulic cylinders 13 and 14 expand or contract to operate the work implement 3.

The control unit 27 controls the hydraulic pressure of the hydraulic fluid supplied to the steering cylinder 18 by controlling the steering control valve 43 on the basis of the detection signals from the steering operation detecting unit 57b. As a result, the steering cylinder 18 is extended and contracted and the traveling direction of the wheel loader 1 is changed.

The control unit 27 controls the power-transmission device 24 on the basis of the detection signals from each of the detecting units. The control of the power-transmission device 24 by the control unit 27 is described in detail below.

Figure 3:
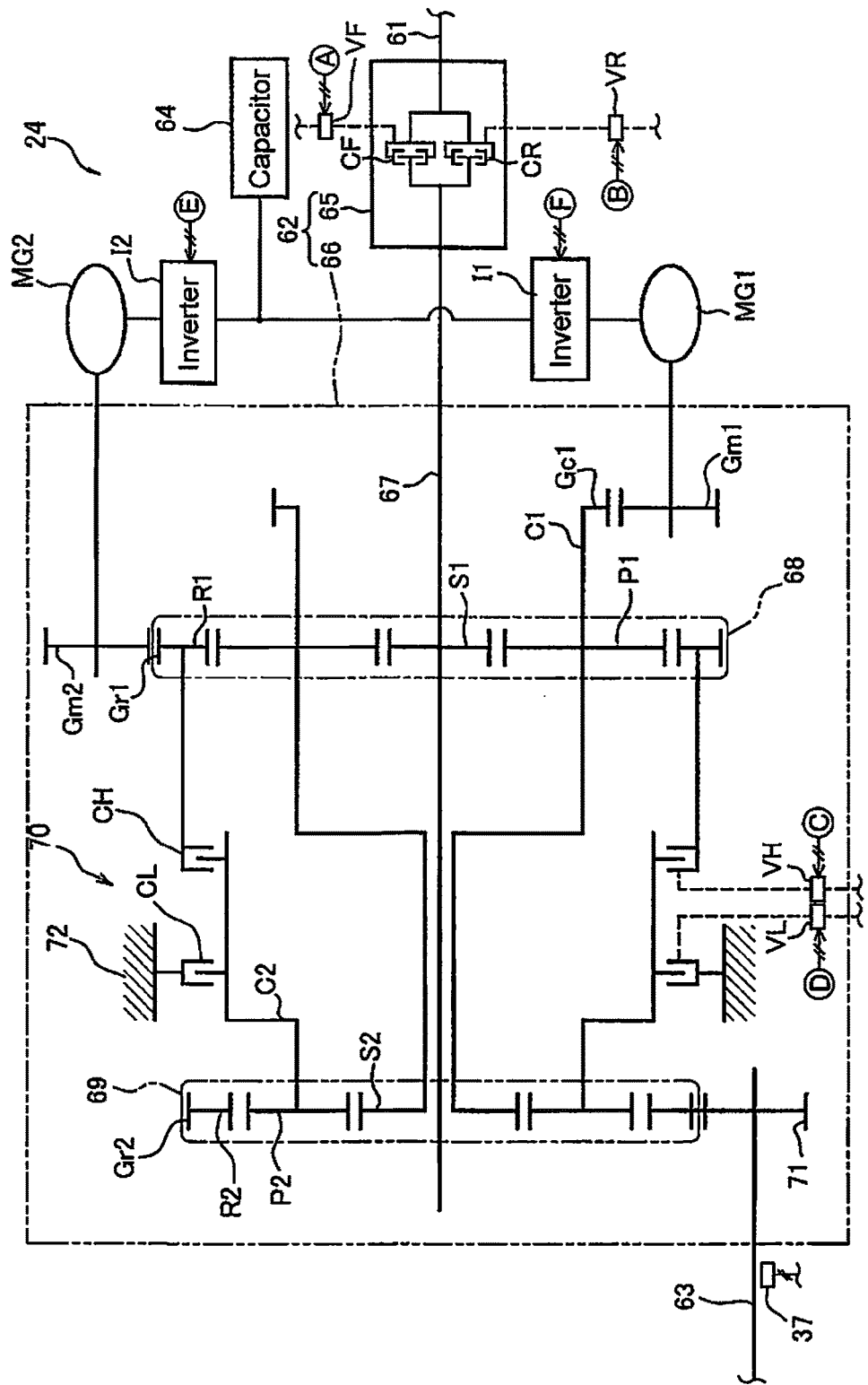
FIG. 3 is a schematic view of a configuration of a power-transmission device.

An explanation of the configuration of the power-transmission device 24 is provided in detail below. FIG. 3 is a schematic view of a configuration of the power-transmission device 24. As illustrated in FIG. 3, the power-transmission device 24 is provided with an input shaft 61, a gear mechanism 62, the output shaft 63, a first motor MG1, a second motor MG2, and a capacitor 64. The input shaft 61 is connected to the above mentioned PTO 22. The rotation from the engine 21 is inputted to the input shaft 61 via the PTO 22. The gear mechanism 62 transmits the rotation of the input shaft 61 to the output shaft 63. The output shaft 63 is connected to the above mentioned travel device 25, and transmits the rotation from the gear mechanism 62 to the above mentioned travel device 25.

The gear mechanism 62 is a mechanism for transmitting driving power from the engine 21. The gear mechanism 62 is configured so that the rotation speed ratio of the output shaft 63 with respect to the input shaft 61 is changed in response to changes in the rotation speeds of the motors MG1 and MG2. The gear mechanism 62 has a FR switch mechanism 65, and a speed change mechanism 66.

The FR switch mechanism 65 has a forward movement clutch CF, a reverse movement clutch CR, and various types of gears (not illustrated). The forward movement clutch CF and the reverse movement clutch CR are hydraulic clutches and hydraulic fluid is supplied from the transmission pump 29 to each of the clutches CF and CR. The hydraulic fluid for the forward movement clutch CF is controlled by a F-clutch control valve VF. The hydraulic fluid for the reverse movement clutch CR is controlled by a R-clutch control valve VR. Each of the clutch control valves CF and CR are controlled by command signals from the control unit 27. The direction of the rotation outputted from the FR switch mechanism 65 is switched due to the switching between ON (connection)/OFF (disconnection) of the forward movement clutch CF and ON (connection)/OFF (disconnection) of the reverse movement clutch CR.

The speed change mechanism 66 has a transmission shaft 67, a first planetary gear mechanism 68, a second planetary gear mechanism 69, a Hi/Lo switch mechanism 70, and an output gear 71. The transmission shaft 67 is coupled to the FR switch mechanism 65. The first planetary gear mechanism 68 and the second planetary gear mechanism 69 are disposed on the same shaft as the transmission shaft 67.

The first planetary gear mechanism 68 has a first sun gear S1, a plurality of first planet gears P1, a first carrier C1 that supports the plurality of first planet gears P1, and a first ring gear R1. The first sun gear S1 is coupled to the transmission shaft 67. The plurality of first planet gears P1 mesh with the first sun gear S1 and are supported in a rotatable manner by the first carrier C1. A first carrier gear Gc1 is provided on an outer peripheral part of the first carrier C1. The first ring gear RE meshes with the plurality of first planet gears P1 and is able to rotate. A first ring outer periphery gear Gr1 is provided on the outer periphery of the first ring gear R1.

The second planetary gear mechanism 69 has a second sun gear S2, a plurality of second planet gears P2, a second carrier C2 that supports the plurality of second planet gears P2, and a second ring gear R2. The second sun gear S2 is coupled to the first carrier C1. The plurality of second planet gears P2 mesh with the second sun gear S2 and are supported in a rotatable manner by the second carrier C2. The second ring gear R2 meshes with the plurality of second planet gears P2 and is able to rotate. A second ring outer periphery gear Gr2 is provided on the outer periphery of the second ring gear R2. The second ring outer periphery gear Gr2 meshes with the output gear 71, and the rotation of the second ring gear R2 is outputted to the output shaft 63 via the output gear 71.

The Hi/Lo switch mechanism 70 is a mechanism for switching the drive-power transmission path of the power-transmission device 24 between a high-speed mode (Hi mode) in which the vehicle speed is high and a low-speed mode (Lo mode) in which the vehicle speed is low. The Hi/Lo switch mechanism 70 has an H-clutch CH that is ON during the Hi mode and a L-clutch CL that is ON during the Lo mode. The H-clutch CH connects or disconnects the first ring gear R1 and the second carrier C2. The L-clutch CL connects or disconnects the second carrier C2 and a fixed end 72 to prohibit or allow the rotation of the second carrier C2.

Each of the clutches CH and CL are hydraulic clutches, and hydraulic fluid from the transmission pump 29 is supplied to each of the clutches CH and CL. The hydraulic fluid for the H-clutch CH is controlled by an H-clutch control valve VH. The hydraulic fluid for the L-clutch CL is controlled by an L-clutch control valve VL. Each of the clutch control valves VH and VL are controlled by command signals from the control unit 27.

The first motor MG1 and the second motor MG2 function as drive motors that generate driving power using electrical energy. The first motor MG1 and the second motor MG2 also function as generators that use inputted driving power to generate electrical energy. The first motor MG1 functions as a generator when a command signal from the control unit 27 is applied to activate torque to the first motor MG1 in the reverse direction of the rotating direction of the first motor MG1. A first motor gear Gm1 is fixed to the output shaft of the first motor MG1 and the first motor gear Gm1 meshes with the first carrier gear Gc1. A first inverter I1 is connected to the first motor MG1 and a command signal for controlling the motor torque of the first motor MG1 is applied to the first inverter 11 from the control unit 27.

The second motor MG2 is configured in the same way as the first motor MG1. A second motor gear Gm2 is fixed to the output shaft of the second motor MG2 and the second motor gear Gm2 meshes with the first ring outer periphery gear Gr1. A second inverter I2 is connected to the second motor MG2 and a command signal for controlling the motor torque of the second motor MG2 is applied to the second inverter I2 from the control unit 27.

The capacitor 64 functions as an energy reservoir unit for storing energy generated by the motors MG1 and MG2. That is, the capacitor 64 stores electrical power generated by each of the motors MG1 and MG2 when the total electrical power generation amount of each of the motors MG1 and MG2 is high. The capacitor 64 releases electrical power when the total electrical power consumption amount of each of the motors MG1 and MG2 is high. That is, each of the motors MG1 and MG2 are driven by electrical power stored in the capacitor 64. A battery may be used as another electrical power storage means in place of a capacitor.

The control unit 27 receives detection signals from the various detecting units and applies command signals for indicating the command torques for the motors MG1 and MG2 to each of the inverters I1 and I2. The control unit 27 also applies command signals for controlling the clutch hydraulic pressure of each of the clutches CF, CR, CH, and CL to each of the clutch control valves VF, VR, VH, and VL. As a result, the speed change ratio and the output torque of the power-transmission device 24 are controlled. The following is an explanation of the operations of the power-transmission device 24.

Figure 4:
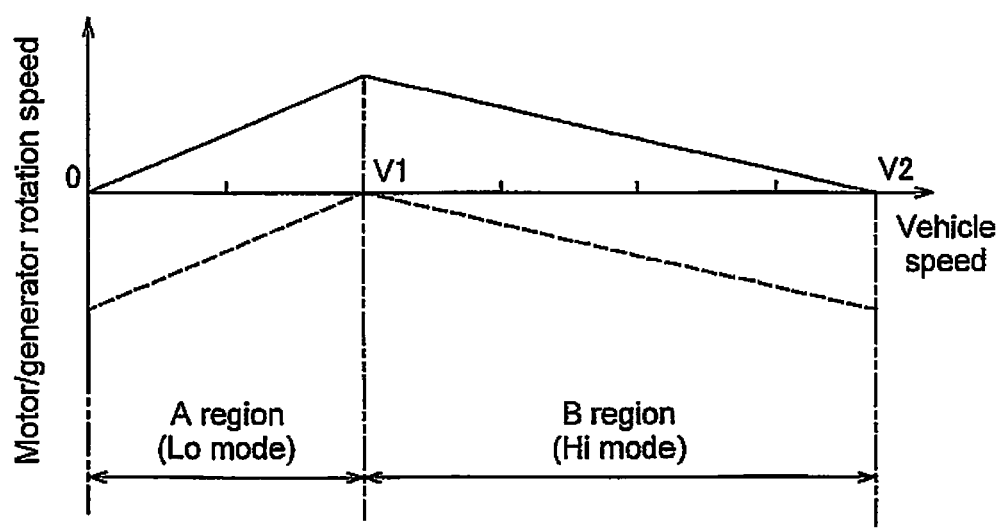
FIG. 4 illustrates changes in rotation speeds of a first motor and a second motor with respect to the vehicle speed.

An outline of operations of the power-transmission device 24 when the vehicle speed increases from zero in the forward movement side while the rotation speed of the engine 21 remains fixed, will be explained with reference to FIG. 4. FIG. 4 illustrates the rotation speeds of each of the motors MG1 and MG2 with respect to the vehicle speed. When the rotation speed of the engine 21 is fixed, the vehicle speed changes in response to the rotation speed ratio of the power-transmission device 24. The rotation speed ratio is the ratio of the rotation speed of the output shaft 63 with respect to the rotation speed of the input shaft 61. Therefore, the variation in the vehicle speed in FIG. 4 matches the variation of the rotation speed ratio of the power-transmission device 24. That is, FIG. 4 illustrates the relationship between the rotation speeds of each of the motors MG1 and MG2 and the rotation speed ratio of the power-transmission device 24. In FIG. 4, the solid line represents the rotation speed of the first motor MG1, and the dashed line represents the rotation speed of the second motor MG2.

In an A region (Lo mode) with a vehicle speed from zero to V1, the L-clutch CL is ON (connected) and the H-clutch CH is OFF (disconnected). Because the H-clutch CH is OFF in the A region, the second carrier C2 and the first ring gear R1 are disconnected. Because the L-clutch CL is ON, the second carrier C2 is fixed.

In an A region, the driving power from the engine 21 is inputted to the first sun gear S1 via the transmission shaft 67, and the driving power is outputted from the first carrier C1 to the second sun gear S2. Conversely, the driving power inputted to the first sun gear S1 is transmitted from the first planet gears P1 to the first ring gear R1 and outputted through the first ring outer periphery gear Gr1 and the second motor gear Gm2 to the second motor MG2. In the A region, the second motor MG2 functions mainly as a generator, and a portion of the electrical power generated by the second motor MG2 is stored in the capacitor 64.

The first motor MG1 functions mainly as an electric motor in the A region. The driving power of the first motor MG1 is outputted to the second sun gear S2 along a path from the first motor gear Gm1 to the first carrier gear Gc1 to the first carrier C1. The driving power outputted to the second sun gear S2 as described above is transmitted to the output shaft 63 along a path from the second planet gears P2 to the second ring gear R2 to the second ring outer periphery gear Gr2 to the output gear 71.

In a B region (Hi mode) in which the vehicle speed exceeds V1, the H-clutch CH is ON (connected) and the L-clutch CL is OFF (disconnected). Because the H-clutch CH is ON in the B region, the second carrier C2 and the first ring gear R1 are connected. Because the L-clutch CL is OFF, the second carrier C2 is released. Therefore, the rotation speed of the first ring gear R1 and the second carrier C2 match.

In the B region, the driving power from the engine 21 is inputted to the first sun gear S1 and the driving power is outputted from the first carrier C1 to the second sun gear S2. The driving power inputted to the first sun gear S1 is outputted from the first carrier C1 through the first carrier gear Gc1 and the first motor gear Gm1 to the first motor MG1. In the B region, the first motor MG1 functions mainly as a generator, and thus a portion of the electrical power generated by the first motor MG1 is stored in the capacitor 64.

The driving power of the second motor MG2 is outputted to the second carrier C2 along a path from the second motor gear Gm2 to the first ring outer periphery gear Gr1 to the first ring gear R1 to the H-clutch CH. The driving power outputted to the second sun gear S2 as described above is outputted through the second planet gears P2 to the second ring gear R2, and the driving power outputted to the second carrier C2 is outputted through the second planet gears P2 to the second ring gear R2. The driving power joined by the second ring gear R2 in this way is transmitted through the second ring outer periphery gear Gr2 and the output gear 71 to the output shaft 63.

While forward movement driving has been discussed above, the operations of reverse movement driving are the same. During braking, the roles of the first motor MG1 and the second motor MG2 as generator and motor are reversed from the above explanation.

The control of the power-transmission device 24 by the control unit 27 is described in detail below. The control unit 27 controls the output torque of the power-transmission device 24 by controlling the motor torque of the first motor MG1 and the second motor MG2. That is, the control unit 27 controls the tractive force of the work vehicle 1 by controlling the motor torque of the first motor MG1 and the second motor MG2.

Figure 5:
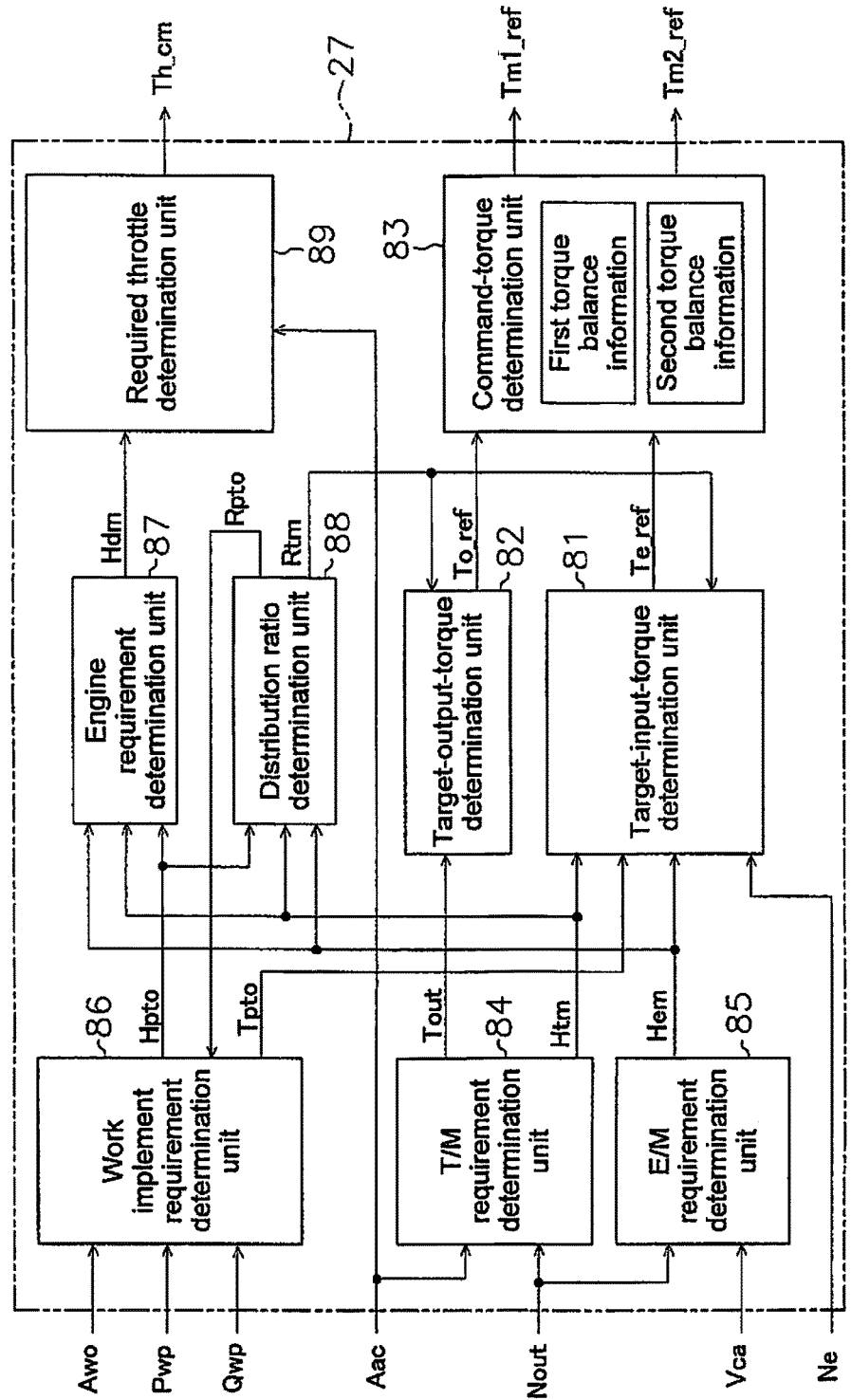
FIG. 5 is a control block diagram illustrating an overall outline of processing executed by a control unit.
Figure 6:
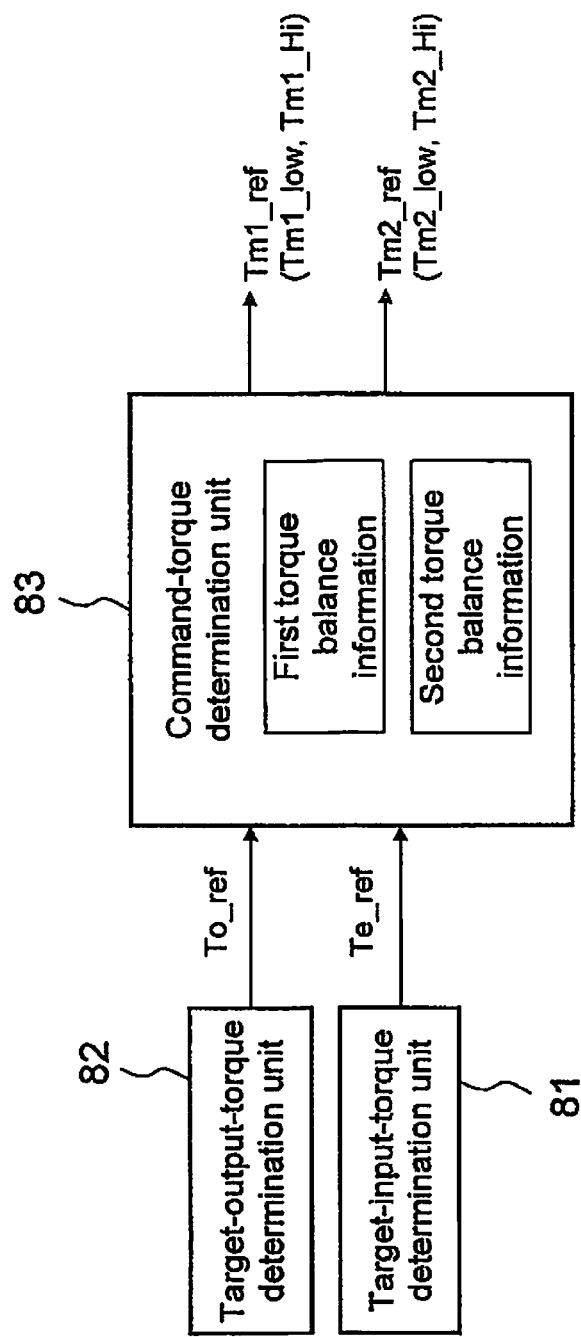
FIG. 6 is a control block diagram illustrating processing executed by the control unit to determine command torques.

A method for determining the command values (referred to below as "command torque") of the motor torque to the first motor MG1 and the second motor MG2 is explained below. FIGS. 5 to 13 are control block diagrams illustrating processing executed by the control unit 27. As illustrated in FIGS. 5 and 6, the control unit 27 has a target-input-torque determination unit 81, a target-output-torque determination unit 82, and a command-torque determination unit 83.

The target-input-torque determination unit 81 determines a target input torque Te_ref. The target input torque Te_ref is a target value for the torque to be inputted to the power-transmission device 24. The target-output-torque determination unit 82 determines a target output torque To_ref. The target output torque To_ref is a target value for the torque to be outputted from the power-transmission device 24. The command-torque determination unit 83 uses torque-balance information to determine command torques Tm1_ref and Tm2_ref to the motors MG1 and MG2 from the target input torque Te_ref and the target output torque To_ref. The torque-balance information defines a relationship between the target input torque Te_ref and the target output torque To_ref so as to achieve a balance of the torques of the power-transmission device 24. The torque-balance information is stored in the storage unit 56.

As described above, the transmission paths of the driving power in the power-transmission device 24 are different for the Lo mode and the Hi mode. As a result, the command-torque determination unit 83 uses different torque-balance information to determine the command torques Tm1_ref and Tm2_ref for the motors MG1 and MG2 in the Lo mode and the Hi mode. Specifically, the command-torque determination unit 83 uses first torque-balance information represented by equation 1 below to determine command torques Tm1_Low and Tm2_Low for the motors MG1 and MG2 in the Lo mode. In the present exemplary embodiment, the first torque-balance information is an equation for balancing the torques of the power-transmission device 24.

$$Ts1\_Low = Te\_ref * r\_fr$$
$$Tc1\_Low = Ts1\_Low * (-1) * ((Zr1/Zs1)+1)$$
$$Tr2\_Low = To\_ref * (Zod/Zo)$$
$$Ts2\_Low = Tr2\_Low * (Zs2/Zr2)$$
$$Tcp1\_Low = Tc1\_Low + Ts2\_Low$$
$$Tm1\_Low = Tcp1\_Low * (-1) * (Zp1/Zp1d)$$
$$Tr1\_Low = Ts1\_Low * (Zr1/Zs1)$$
$$Tm2\_Low = Tr1\_Low * (-1) * (Zp2/Zp2d) \quad \text{(Equation 1)}$$

The command-torque determination unit 83 uses second torque-balance information represented by equation 2 below to determine command torques Tm1_Hi and Tm2_Hi for the motors MG1 and MG2 in the Hi mode. In the present embodiment, the second torque-balance information is an equation for balancing the torques of the power-transmission device 24.

$$Ts1\_Hi = Te\_ref * r\_fr$$
$$Tc1\_Hi = Ts1\_Hi * (-1) * ((Zr1/Zs1)+1)$$
$$Tr2\_Hi = To\_ref * (Zod/Zo)$$
$$Ts2\_Hi = Tr2\_Hi * (Zs2/Zr2)$$
$$Tcp1\_Hi = Tc1\_Hi + Ts2\_Hi$$
$$Tm1\_Hi = Tcp1\_Hi * (-1) * (Zp1/Zp1d)$$
$$Tr1\_Hi = Ts1\_Hi * (Zr1/Zs1)$$
$$Tc2\_Hi = Tr2\_Hi * (-1) * ((Zs2/Zr2)+1)$$
$$Tcp2\_Hi = Tr1\_Hi + Tc2\_Hi$$
$$Tm2\_Hi = Tcp2\_Hi * (-1) * (Zp2/Zp2d) \quad \text{(Equation 2)}$$

The contents of the parameters in each torque-balance information are depicted in Table 1 below.

TABLE 1

| | |
|---|---|
| Te_ref | Target input torque |
| To_ref | Target output torque |
| r_fr | Deceleration ratio for the FR switch mechanism 65 (The FR switch mechanism 65 outputs the engine rotation speed to decelerate to 1/r_fr. When the FR switch mechanism 65 is in the forward movement state, r_fr is a negative value. When the FR switch mechanism 65 is in the reverse movement state, r_fr is a positive value.) |
| Zs1 | Number of teeth of the sun gear S1 in the first planetary gear mechanism 68. |
| Zr1 | Number of teeth of the ring gear R1 in the first planetary gear mechanism 68. |
| Zp1 | Number of teeth in the first carrier gear Gc1 |
| Zp1d | Number of teeth of the first motor gear Gm1 |
| Zs2 | Number of teeth of the sun gear S2 in the second planetary gear mechanism 69. |
| Zr2 | Number of teeth of the ring gear R2 in the second planetary gear mechanism 69. |
| Zp2 | Number of teeth of the first ring outer periphery gear Gr1 |
| Zp2d | Number of teeth of the second motor gear Gm2 |
| Zo | Number of teeth of the second ring outer periphery gear Gr2 |
| Zod | Number of teeth of the output gear 71 |

Next, a method for determining the target input torque Te_ref and the target output torque To_ref will be explained. While the target input torque Te_ref and the target output torque To_ref can be set optionally, in the present exemplary embodiment the target input torque Te_ref and the target output torque To_ref are determined so that predetermined vehicle speed—tractive force characteristics can be achieved in which the tractive force changes continuously in response to the vehicle speed.

Figure 7:
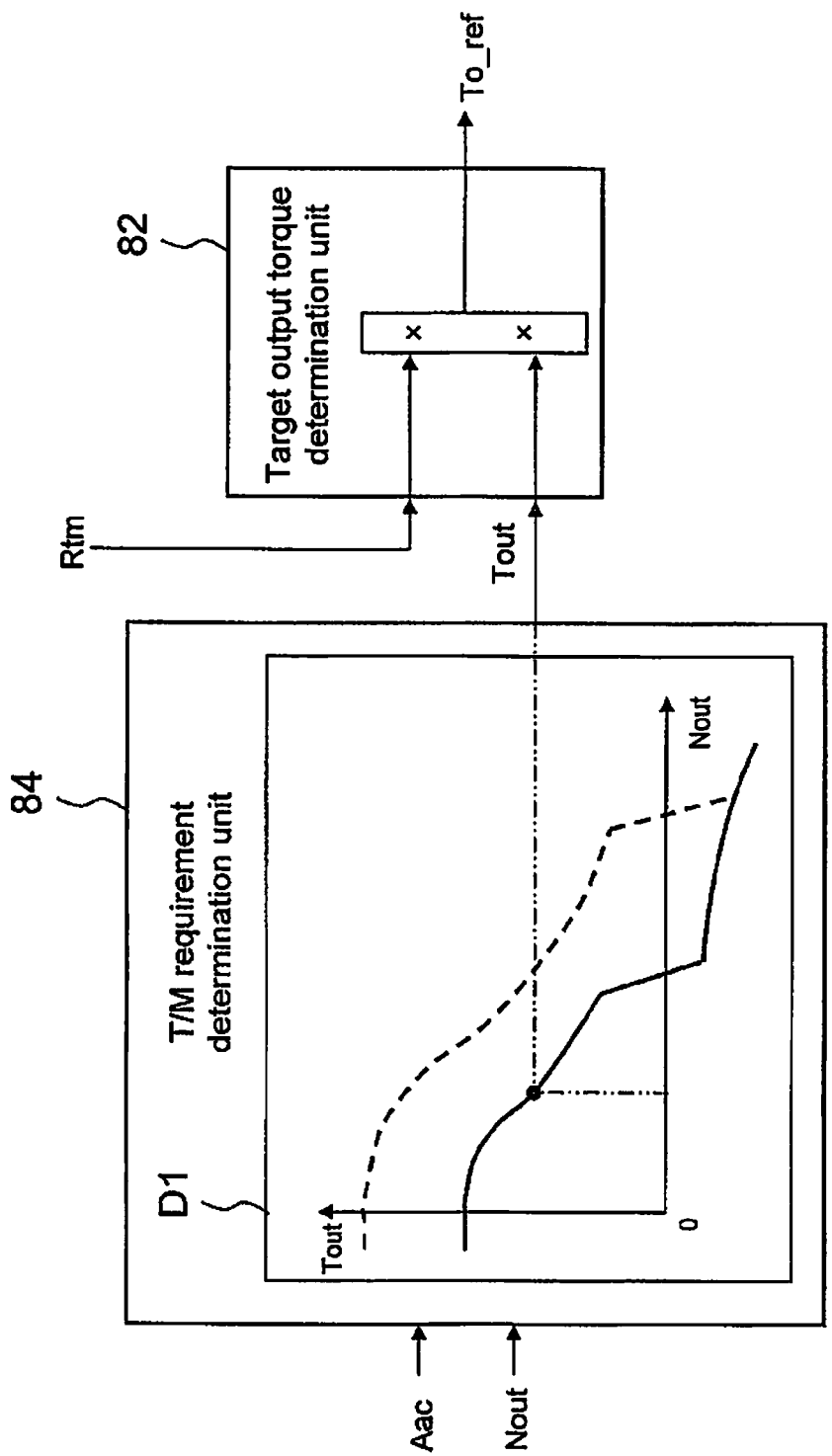
FIG. 7 is a control block diagram illustrating processing executed by the control unit to determine a target output torque.

FIG. 7 illustrates processing for determining the target output torque To_ref. As illustrated in FIG. 7, the control unit 27 has a transmission requirement determination unit 84. The transmission requirement determination unit 84 determines a required tractive force Tout on the basis of an accelerator operating amount Aac and an output rotation speed Nout. The accelerator operating amount Aac is detected by the accelerator operation detecting unit 51b. The output rotation speed Nout is detected by the vehicle speed detecting unit 37.

The transmission requirement determination unit 84 determines the required tractive force Tout from the output rotation speed Nout on the basis of required tractive force characteristics information D1 stored in the storage unit 56. The target-output-torque determination unit 82 determines the target output torque To_ref on the basis of the required tractive force Tout. Specifically, the target-output-torque determination unit 82 determines the target output torque To_ref by multiplying the required tractive force Tout by a transmission output ratio Rtm. The transmission output ratio Rtm is explained below.

The required tractive force characteristics information D1 is data indicating the required tractive force characteristics for defining the relationship between the output rotation speed Nout and the required tractive force Tout. The required tractive force characteristics correspond to the above mentioned predetermined vehicle speed—tractive force characteristics. That is, the target output torque To_ref is determined so that the tractive force outputted from the power-transmission device 24 follows the required tractive force characteristics defined by the required tractive force characteristics information D1.

Figure 8:
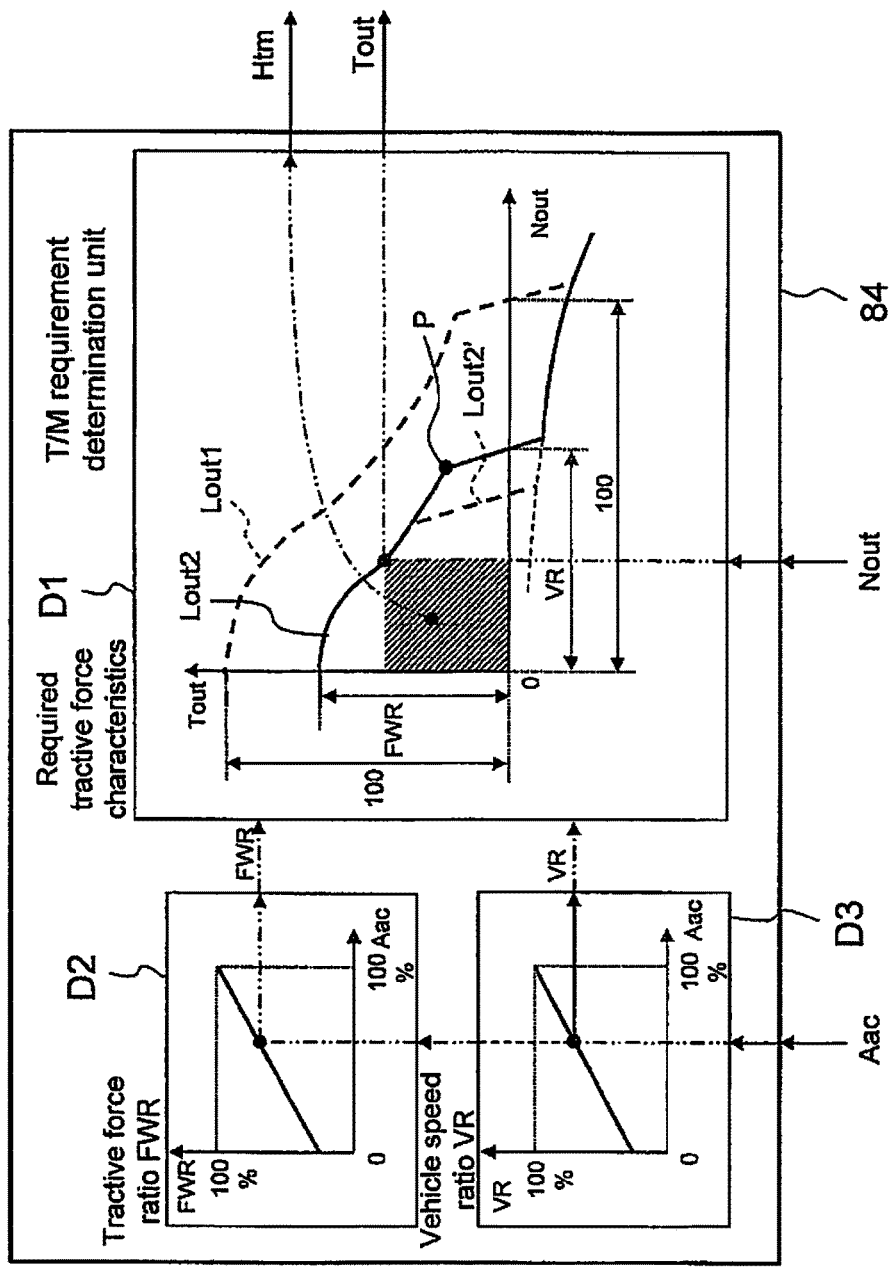
FIG. 8 is a control block diagram illustrating processing executed by the control unit to determine a transmission required horsepower and required tractive force.

Specifically, as illustrated in FIG. 8, the storage unit 56 stores data Lout1 (referred to below as "basic tractive force characteristics Lout1") indicating basic required tractive force characteristics. The basic tractive force characteristics Lout1 are required tractive force characteristics when the accelerator operating amount Aac is at the maximum value, that is, at 100%. The basic tractive force characteristics Lout1 are determined in response to a speed range selected by the speed change operating member 53a. The transmission requirement determination unit 84 determines current required tractive force characteristics Lout2 by multiplying the basic tractive force characteristics Lout1 by a tractive force ratio FWR and a vehicle speed ratio VR.

The storage unit 56 stores tractive force ratio information D2 and vehicle speed ratio information D3. The tractive force ratio information D2 defines the tractive force ratio FWR with respect to the accelerator operating amount Aac. The vehicle speed ratio information D3 defines the vehicle speed ratio VR with respect to the accelerator operating amount Aac. The transmission requirement determination unit 84 determines the tractive force ratio FWR and the vehicle speed ratio VR in response to the accelerator operating amount Aac. The transmission requirement determination unit 84 determines the current required tractive force characteristics Lout2 in response to the accelerator operating amount Aac by multiplying the basic tractive force characteristics Lout1 by the tractive force ratio FWR in the vertical axis direction which indicates the required tractive force and the vehicle speed ratio VR in the horizontal axis direction which indicates the output rotation speed Nout.

The tractive force ratio information D2 defines the tractive force ratio FWR that increases in correspondence to an increase in the accelerator operating amount Aac. The vehicle speed ratio information D3 defines the vehicle speed ratio VR which increases in correspondence to an increase in the accelerator operating amount Aac. However, the tractive force ratio FWR is greater than zero when the accelerator operating amount is zero. Similarly, the vehicle speed ratio VR is greater than zero when the accelerator operating amount Aac is zero. As a result, the required tractive force Tout is a value greater than zero when the accelerator operating member 51a is not being operated. That is, tractive force is being outputted from the power-transmission device 24 even when the accelerator operating member 51a is not being operated. As a result, a behavior similar to creep generated in a torque converter-type speed change device is materialized in the EMT-type power-transmission device 24.

The required tractive force characteristics information D1 defines the required tractive force Tout that increases in response to a reduction in the output rotation speed Nout. When the above mentioned speed change operating member 53a is operated, the transmission requirement determination unit 84 changes the required tractive force characteristics in response to the speed range selected by the speed change operating member 53a. For example, when a down-shift is conducted using the speed change operating member 53a, the required tractive force characteristics information changes from Lout2 to Lout2' as illustrated in FIG. 8. As a result, the upper limit of the output rotation speed Nout is reduced. That is, the upper limit of the vehicle speed is reduced.

The required tractive force characteristics information D1 defines the negative required tractive force Tout with respect to the output rotation speed Nout that is no less than the predetermined speed. As a result, the required tractive force Tout is determined to be a negative value when the output rotation speed Nout is larger than the upper limit of the output rotation speed in the selected speed range. A braking force is generated when the required tractive force Tout is a negative value. As a result, a behavior similar to engine brake generated in a torque converter-type speed change device is materialized in the EMT-type power-transmission device 24.

Figure 9:
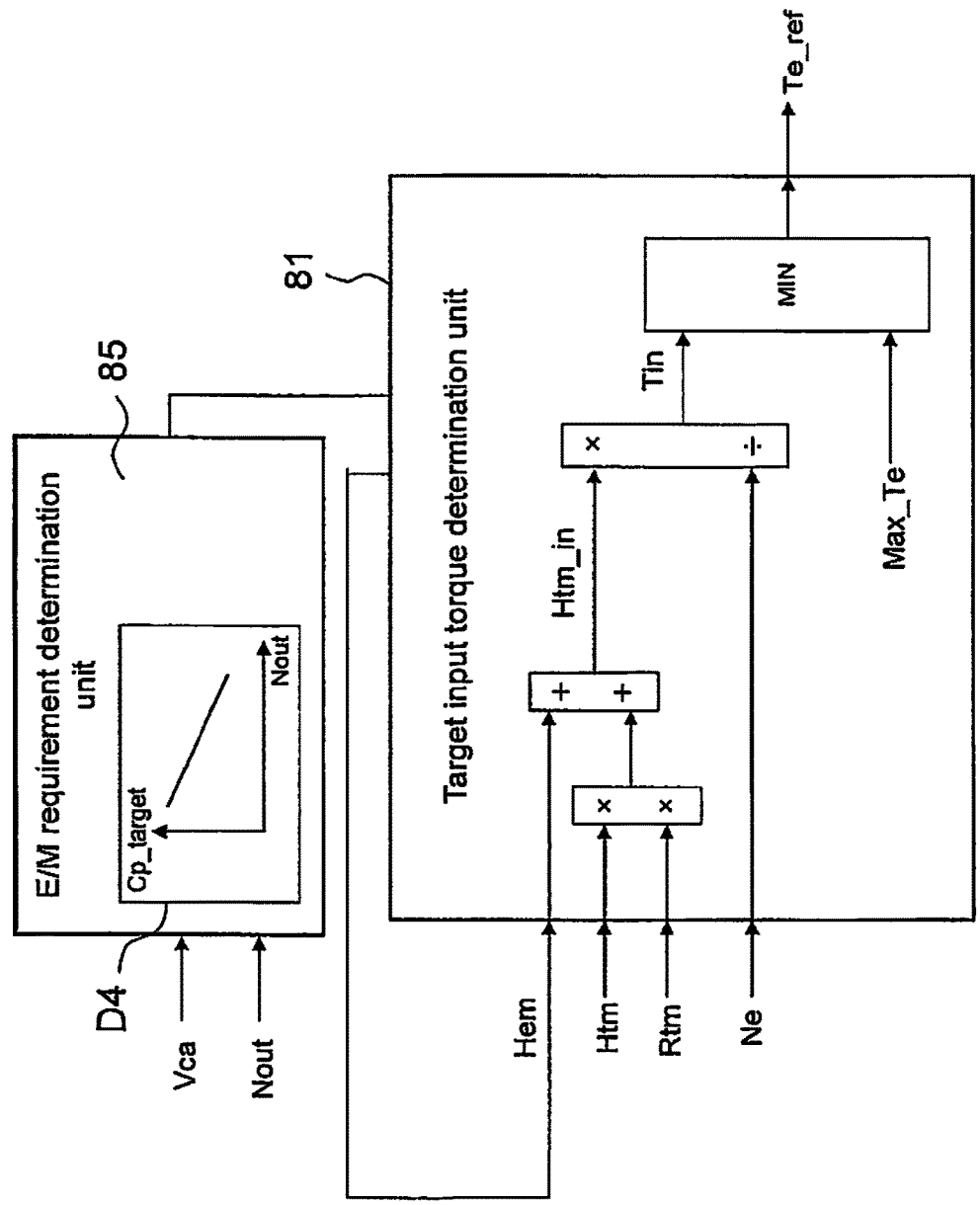
FIG. 9 is a control block diagram illustrating processing executed by the control unit to determine a target input torque.

FIG. 9 illustrates processing for determining the target input torque Te_ref. The target-input-torque determination unit 81 determines the target input torque Te-ref on the basis of a transmission required horsepower Htm and an energy management required horsepower Hem. Specifically the target-input-torque determination unit 81 calculates a transmission required input horsepower Htm_in by adding the energy management required horsepower Hem to a value derived by multiplying the transmission required horsepower Htm by the transmission output ratio Rtm. The transmission required horsepower Htm is a horsepower required by the power-transmission device 24 for realizing the above mentioned required tractive force characteristics, and is calculated by multiplying the current output rotation speed Nout by the above mentioned required tractive force Tout (see FIG. 8). The energy management required horsepower Hem is a horsepower required by the power-transmission device 24 for charging the below mentioned capacitor 64. Therefore, the transmission required input horsepower Htm_in is an output of a desired tractive force from the power-transmission device 24 and a horsepower required for charging the capacitor 64 with the power-transmission device 24. However, the Hem being a negative value signifies that discharging of the capacitor 64 is required.

The target-input-torque determination unit 81 then converts the transmission required input horsepower Htm_in to a torque and determines the target input torque Te_ref so as not to exceed a predetermined upper limit target input torque Max_Te. Specifically, the target-input-torque determination unit 81 calculates a transmission required input torque Tin by dividing the transmission required input horsepower Htm_in by a current engine rotation speed Ne. The target-input-torque determination unit 81 then determines the smaller of the transmission required input torque Tin and the upper limit target input torque Max_Te as the target input torque Te_ref.

Figure 10:
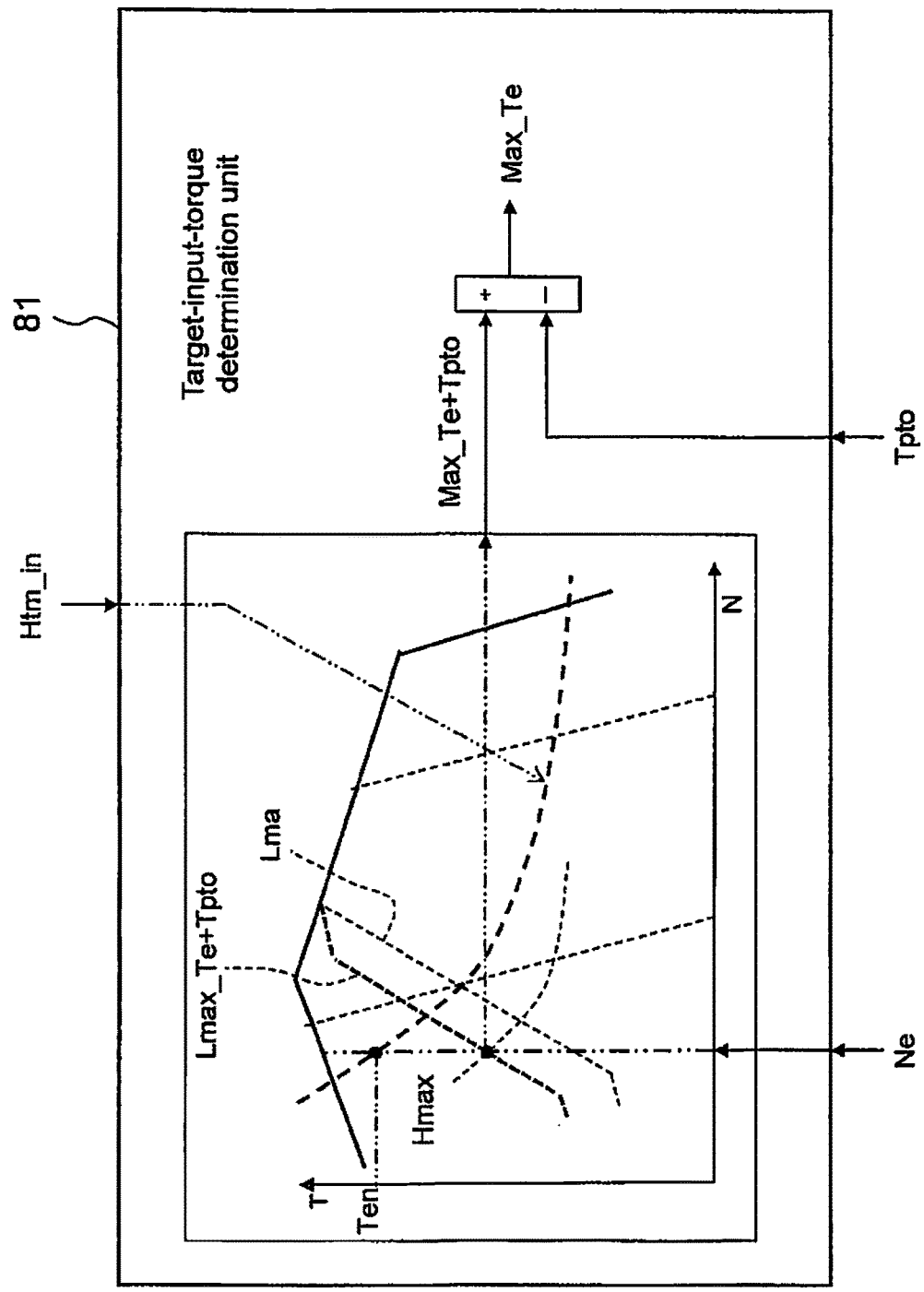
FIG. 10 is a control block diagram illustrating processing executed by the control unit to determine an upper limit target input torque.

FIG. 10 illustrates processing to determine the upper limit target input torque Max_Te. As illustrated in FIG. 10, the upper limit target input torque Max_Te is defined by an upper limit target input torque line Lmax_Te+Tpto. Specifically the target-input-torque determination unit 81 determines an upper limit target input torque Max_Te+Tpto from the upper limit target input torque line Lmax_Te+Tpto and the current engine rotation speed Ne.

The upper limit target input torque line Lmax_Te+Tpto is stored in the storage unit 56 and defines the relationship between the upper limit target input torque Max_Te+Tpto and the engine rotation speed Ne. While the upper limit target input torque line Lmax_Te+Tpto can be set optionally, the upper limit target input torque line Lmax_Te+Tpto in the present exemplary embodiment is defined so that the upper limit target input torque Max_Te+Tpto becomes smaller than a target output torque Ten of the engine 21 determined from the transmission required input horsepower Htm_in and the current engine rotation speed Ne.

The upper limit target input torque Max_Te+Tpto derived from the upper limit target input torque line Lmax_Te+Tpto defines the upper limit of the target input torque in which the transmission required input torque Tin as well as a work implement load torque Tpto are combined. The work implement load torque Tpto is a torque to be distributed to the hydraulic pump through the below mentioned PTO 22. Therefore, the target-input-torque determination unit 81 calculates the upper limit target input torque Max_Te as the upper limit of the target input torque Te_ref by subtracting the work implement load torque Tpto from the upper limit target input torque Max_Te+Tpto which is derived from the upper limit target input torque line Lmax_Te+Tpto.

Next, a method for determining the energy management required horsepower Hem will be explained. As illustrated in FIG. 9, the control unit 27 has an energy management requirement determination unit 85. The energy management requirement determination unit 85 determines the energy management required horsepower Hem on the basis of a remaining amount of electrical power in the capacitor 64.

Specifically, the storage unit 56 stores target capacitor capacity information D4. The target capacitor capacity information D4 defines the relationship between the output rotation speed Nout and a target capacitor capacity Cp_target. Specifically, the energy management requirement determination unit 85 defines the target capacitor capacity Cp_target that grows smaller as the output rotation speed Nout increases. The energy management requirement determination unit 85 refers to the target capacitor capacity information D4 to determine the target capacitor capacity Cp_target from the output rotation speed Nout. The energy management requirement determination unit 85 determines a current capacitor capacity Cp_current from a voltage Vca of the capacitor 64. The energy management requirement determination unit 85 then determines the energy management required horsepower Hem from the following equation 3.

$$Hem = (Cp\_target - Cp\_current) * P\_gain \quad \text{(Equation 3)}$$

P_gain is a predetermined coefficient. The energy management requirement determination unit 85 increases the energy management required horsepower Hem as the current capacitor capacity Cp_current becomes smaller. The energy management requirement determination unit 85 increases the energy management required horsepower Hem as the target capacitor capacity Cp_target becomes larger.

The control of the engine 21 by the control unit 27 is described in detail below. As described above, the control unit 27 controls the engine by transmitting command signals to the fuel injection device 28. A method for determining the command throttle values for the fuel injection device 28 will be explained below.

Figure 12:
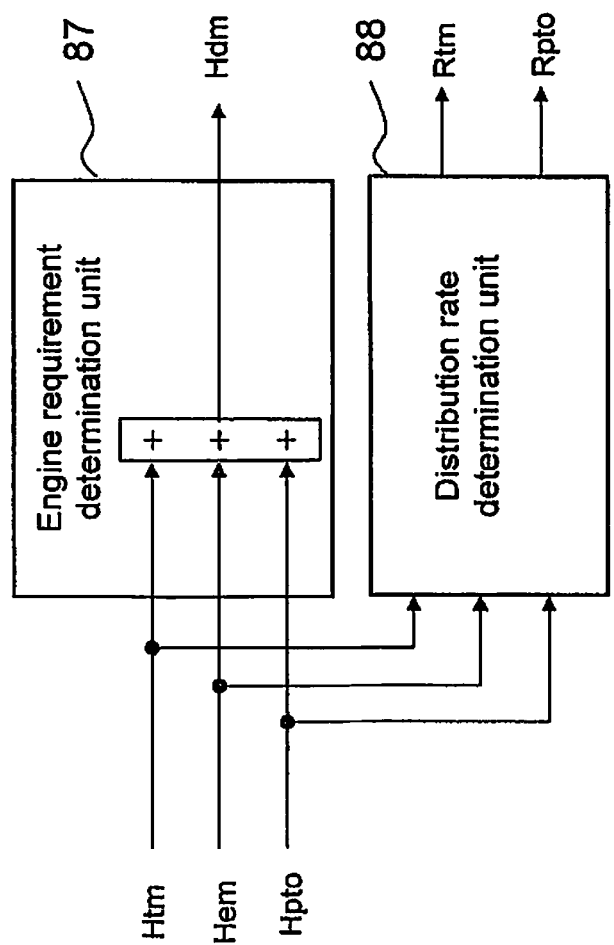
FIG. 12 is a control block diagram illustrating processing executed by the control unit to determine an engine required horsepower, a transmission output ratio and a work implement output ratio.

The command throttle value Th_cm is determined on the basis of an engine required horsepower Hdm required by the engine 21 (see FIG. 12). As described above, a portion of the driving power from the engine 21 is distributed to the power-transmission device 24 and the hydraulic pumps. As a result, the control unit 27 determines the engine required horsepower on the basis of the work implement required horsepower Hpto which is the horsepower distributed to the hydraulic pumps in addition to the above mentioned transmission required horsepower Htm and the energy management required horsepower Hem.

Figure 11:
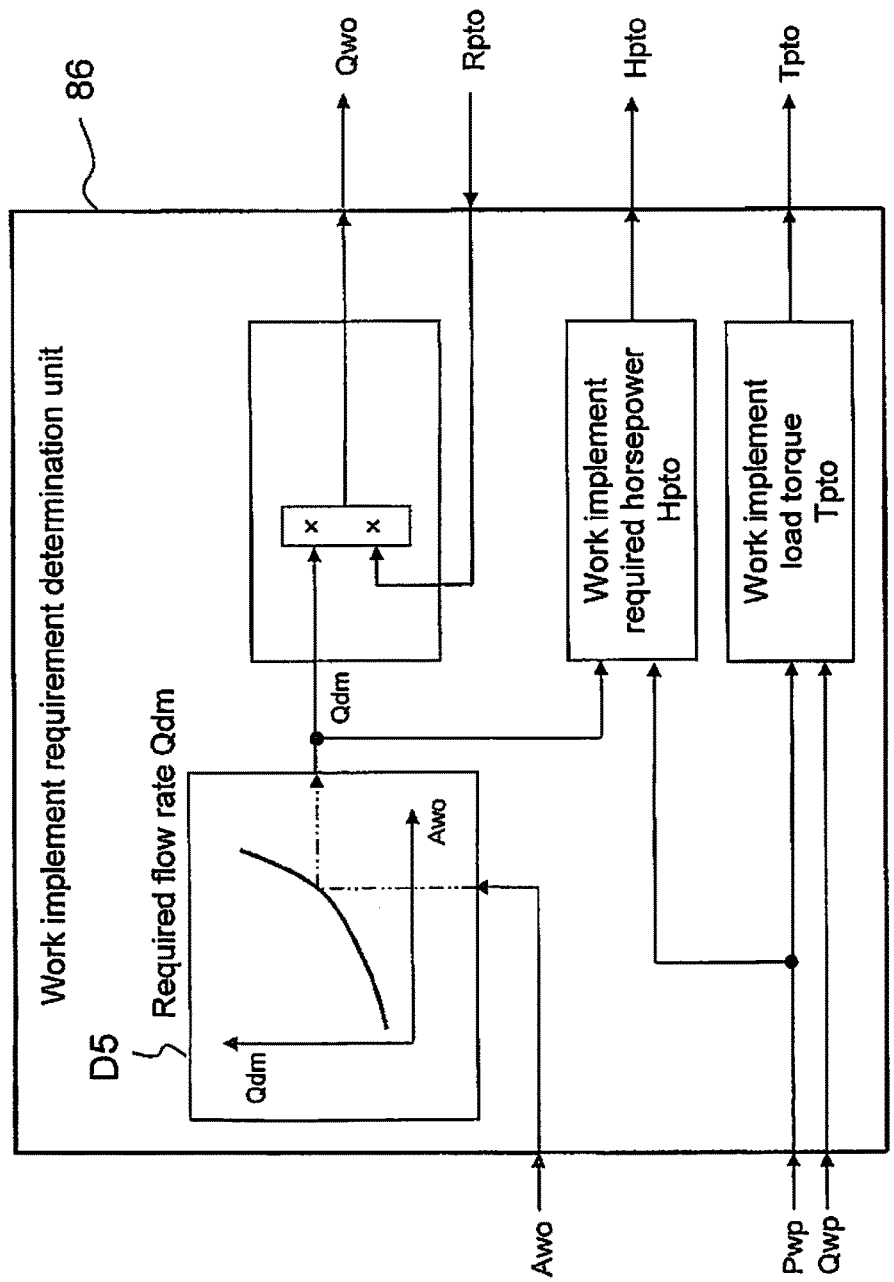
FIG. 11 is a control block diagram illustrating processing executed by the control unit to determine a work implement output flow rate, a work implement required horsepower and a work implement load torque.

As illustrated in FIG. 11, the control unit 27 has a work implement requirement determination unit 86. The work implement requirement determination unit 86 determines the work implement required horsepower Hpto on the basis of a work implement pump pressure Pwp and an operation amount Awo (referred to below as "work implement operation amount Awo") of the work implement operating member 52a. In the present exemplary embodiment, the work implement required horsepower Hpto is a horsepower distributed to the work implement pump 23. However, the work implement required horsepower Hpto may include horsepower distributed to the steering pump 30 and/or the transmission pump 29 as described below.

Specifically, the work implement requirement determination unit 86 determines a required flow rate Qdm of the work implement pump 23 from the work implement operation amount Awo on the basis of required flow rate information D5. The required flow rate information D5 is stored in the storage unit 56 and defines the relationship between the required flow rate Qdm and the work implement operation amount Awo. The work implement requirement determination unit 86 determines the work implement required horsepower Hpto from the required flow rate Qdm and the work implement pump pressure Pwp. Specifically, the work implement requirement determination unit 86 determines the work implement required horsepower Hpto using the following equation 4.

$$Hpto = Qdm/\eta v * Pwp/\eta t \quad \text{(Equation 4)}$$

$\eta v$ is a volume efficiency. $\eta t$ is a torque efficiency. The volume efficiency $\eta v$ and the torque efficiency $\eta t$ are fixed values determined in accordance with the characteristics of the work implement pump 23. The work implement pump pressure Pwp is detected by the work implement pump pressure detecting unit 32.

The work implement requirement determination unit 86 determines the above mentioned work implement load torque Tpto on the basis of the work implement pump pressure Pwp and a work implement output flow rate Qwo. Specifically, the work implement requirement determination unit 86 determines the work implement load torque Tpto using the following equation 5.

$$Tpto=Qwp*Pwp/\eta t \qquad \text{(Equation 5)}$$

Qwp is the displacement volume of the work implement pump. The work implement pump displacement volume Qwp is calculated from the tilt angle detected by the first tilt angle detecting part 33.

The work implement requirement determination unit 86 determines the work implement output flow rate Qwo on the basis of the work implement operation amount Awo. Specifically the work implement requirement determination unit 86 determines the work implement output flow rate Qwo by multiplying the required flow rate Qdm by a work implement output ratio Rpto. The work implement output ratio Rpto is described below. The control unit 27 controls the discharge capacity of the work implement pump 23 in response to the work implement output flow rate Qwo determined as described above.

As illustrated in FIG. 12, the control unit 27 has an engine requirement determination unit 87. The engine requirement determination unit 87 determines an engine required horsepower Hdm on the basis of the work implement required horsepower Hpto, the transmission required horsepower Htm, and the energy management required horsepower Hem. Specifically, the engine requirement determination unit 87 determines the engine required horsepower Hdm by adding the work implement required horsepower Hpto, the transmission required horsepower Htm, and the energy management required horsepower Hem.

Figure 13:
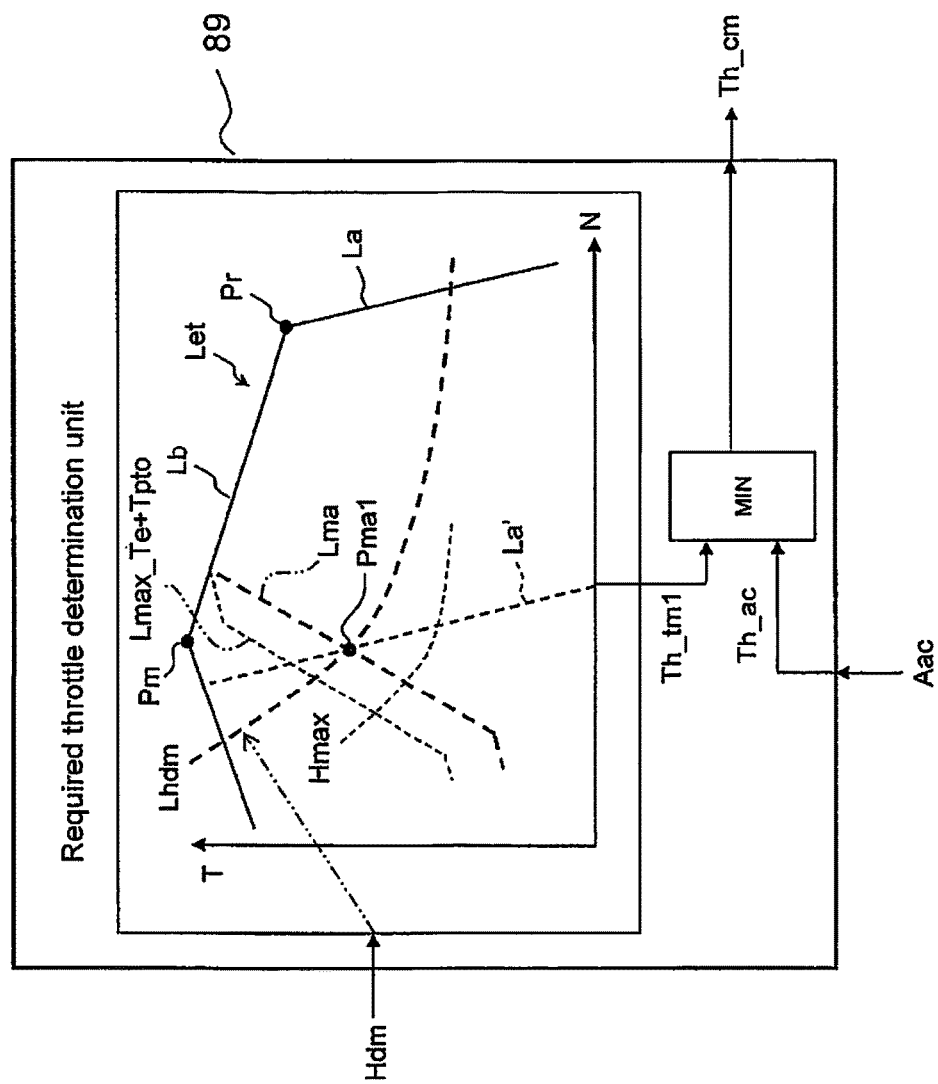
FIG. 13 is a control block diagram illustrating processing executed by the control unit to determine a command throttle value.

As illustrated in FIG. 13, the control unit 27 has a required throttle determination unit 89. The required throttle determination unit 89 determines a command throttle value Th_cm from the engine required horsepower Hdm and the accelerator operating amount Aac.

Specifically, the storage unit 56 stores an engine torque line Let and a matching line Lma. The engine torque line Let defines a relationship between the output torque of the engine 21 and the engine rotation speed Ne. The engine torque line Let includes a regulation region La and a full load region Lb. The regulation region La changes in response to the command throttle value Th_cm (see La' in FIG. 13). The full load region Lb includes a rated point Pr and a maximum torque point Pm located on the low engine rotation speed side from the rated point Pr.

The matching line Lma is information for determining a first required throttle value Th_tm1 from the engine required horsepower Hdm. While the matching line Lma can be set optionally, the matching line Lma in the present exemplary embodiment is set to pass through a position closer to the maximum torque point Pm than the rated point Pr in the full load region Lb of the engine torque line Let.

The required throttle determination unit 89 determines the first required throttle value Th_tm1 so that the engine torque line Let and the matching line Lma coincide at a matching point Pma1 where the output torque of the engine 21 becomes the torque corresponding to the engine required horsepower Hdm. That is, the intersection of an equivalent horsepower line Lhdm corresponding to the engine required horsepower Hdm and the matching line Lma is set as a first matching point Pma1, and the required throttle determination unit 89 determines the first required throttle value Th_tm1 so that the regulation region (see "La") of the engine torque line Let passes through the first matching point Pma1.

The required throttle determination unit 89 determines the lowest of the first required throttle value Th_tm1 and a second required throttle value Th_ac corresponding to the accelerator operating amount Aac as the command throttle value Th_cm.

A method for determining the above mentioned transmission output ratio Rtm and the work implement output ratio Rpto will be explained next. As illustrated in FIG. 12, the control unit 27 has a distribution ratio determination unit 88. The distribution ratio determination unit 88 determines the transmission output ratio Rtm and the work implement output ratio Rpto on the basis of the work implement required horsepower Hpto, the transmission required horsepower Htm, and the energy management required horsepower Hem. The output horsepower from the engine 21 is distributed to the work implement pump 23 and the power-transmission device 24 by the PTO 22. The output horsepower for the power-transmission device 24 is distributed among the horsepower for the tractive force of the power-transmission device 24 and the horsepower for the charging to the capacitor 64. However, when the sum of the work implement required horsepower Hpto, the transmission required horsepower Htm, and the energy management required horsepower Hem becomes greater than the output horsepower from the engine 21, the output horsepower from the engine 21 cannot be distributed as each of the required values. As a result, the sum of each of the required values is limited so as not to exceed the output horsepower from the engine 21 by multiplying the work implement required horsepower Hpto and the transmission required horsepower Htm by the respective output ratios Rpto and Rtm.

Specifically, when the sum of the work implement required horsepower Hpto, the transmission required horsepower Htm, and the energy management required horsepower Hem is equal to or less than a predetermined load upper limit horsepower Hmax, the transmission output ratio Rtm and the work implement output ratio Rpto are each set to "1." That is, the output horsepower of the engine 21 is distributed according to each of the required values of the work implement required horsepower Hpto, the transmission required horsepower Htm, and the energy management required horsepower Hem. The predetermined load upper limit horsepower Hmax is determined on the basis of the current engine rotation speed Ne. Specifically, the predetermined load upper limit horsepower Hmax is determined from the above mentioned upper limit target input torque Max_Te+Tpto and the current engine rotation speed Ne as illustrated in FIG. 10.

The distribution ratio determination unit 88 sets a value less than one as the transmission output ratio Rtm when the total of the work implement required horsepower Hpto, the transmission required horsepower Htm, and the energy management required horsepower Hem is larger than the predetermined load upper limit horsepower Hmax. In this case, the distribution ratio determination unit 88 prioritizes the energy management required horsepower Hem and determines the transmission output ratio Rtm and the work implement output ratio Rpto. That is, the distribution ratio determination unit 88 divides the work implement required horsepower Hpto and the transmission required horsepower Htm into priority portions and ratio portions. The distribution ratio determination unit 88 preferentially distributes the output horsepower from the engine 21 as in the following order.

Figure 14:
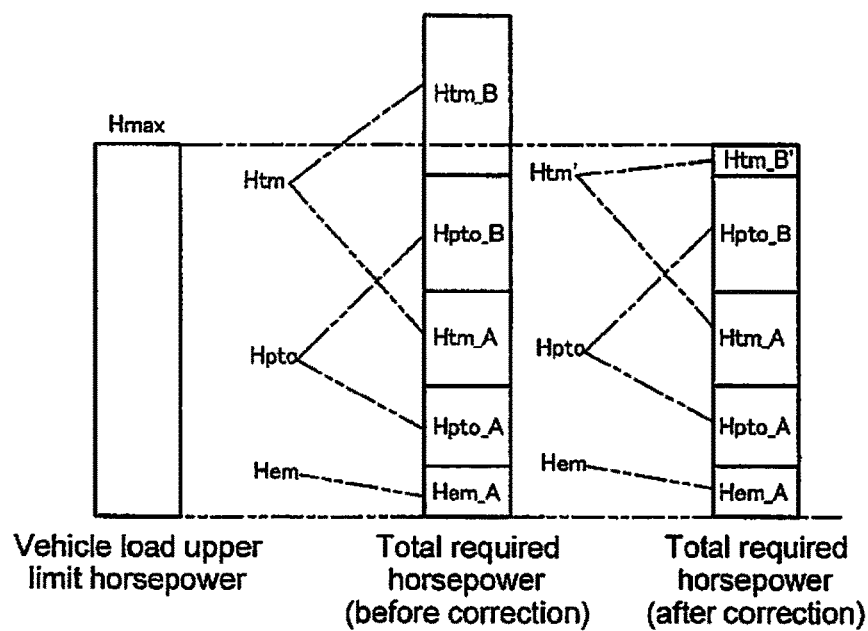
FIG. 14 illustrates a method for distributing output horsepower from an engine.

1. Energy management required horsepower Hem
2. Priority portion Hpto_A of the work implement required horsepower Hpto 3. Priority portion Htm_A of the transmission required horsepower Htm
4. Ratio portion Hpto_B of the work implement required horsepower Hpto
5. Ratio portion Htm_B of the transmission required horsepower Htm For example as illustrated in FIG. 14, while the sum from the energy management required horsepower Hem to the ratio portion Hpto_B of the work implement required horsepower Hpto (Hem_A+Hpto_A+Htm_A+Hpto_B) is less than the predetermined load upper limit horsepower Hmax, when the sum from the energy management required horsepower Hem_A to the ratio portion Htm_B of the transmission required horsepower Htm is greater than the predetermined load upper limit horsepower Hmax, the ratio portion of the transmission required horsepower Htm is corrected from Htm_B to Htm_B' which is less than Htm_B so that the sum becomes equal to or less than the predetermined load upper limit horsepower Hmax. The ratio of the corrected transmission required horsepower Htm' with respect to the uncorrected transmission required horsepower Htm is determined as the transmission output ratio Rtm.

Figure 15:
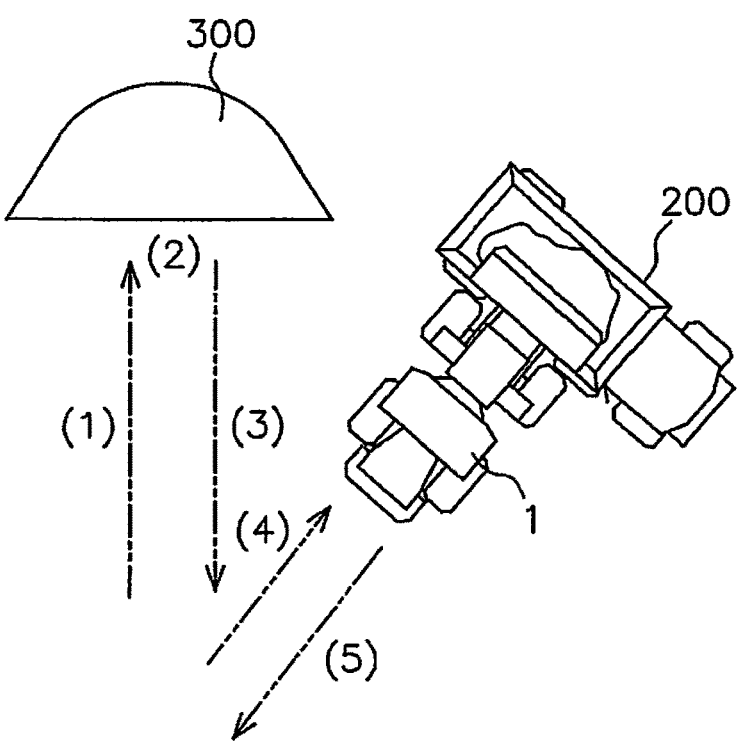
FIG. 15 illustrates operations of the work vehicle while carrying out a V-shaped work.

Controls during a V-shaped work as an example of controlling during work of the work vehicle 1 according to the present exemplary embodiment will be explained next. FIG. 15 illustrates operations of the work vehicle 1 during a V-shaped work. The V-shaped work typically involves loading a load such as earth from a pile 300 in which a conveyance substance such as earth is accumulated onto the bed of a dump truck 200. As illustrated in FIG. 15, the V-shaped work involves five work aspects which are (1) moving forward to approach the pile 300, (2) plunging into the pile 300 to load the load into the bucket 12 (referred to as "digging" below), (3) moving in reverse to move away from the pile 300, (4) moving forward to approach the dump truck 200 (referred to below as "dump approach") and lowering the load from the bucket 12 onto the bed of the dump truck 200 (referred to as "dumping" below), and (5) moving in reverse to move away from the dump truck 200.

Figure 16:
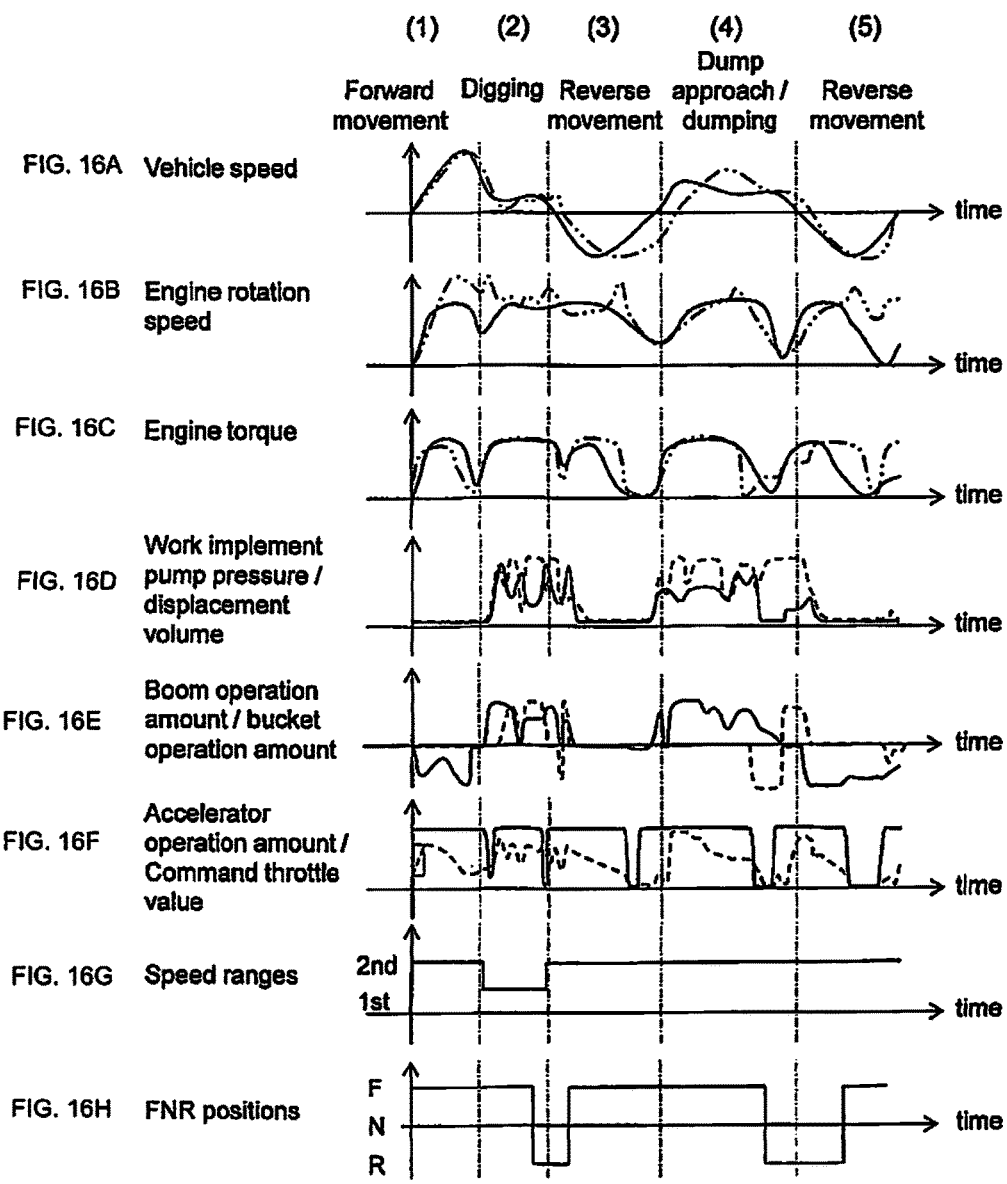
FIGS. 16A-16H are timing charts illustrating changes in parameters of the work vehicle carrying out a V-shaped work.

FIG. 16 is a timing chart illustrating changes in each parameter of the work vehicle 1 carrying out the V-shaped work. FIG. 16A illustrates the vehicle speed. The chain double-dashed line in FIG. 16A indicates the vehicle speed of a conventional torque converter-type work vehicle as a comparative example. FIG. 16B illustrates the engine rotation speed. The chain double-dashed line in FIG. 16B indicates the engine rotation speed of a conventional torque converter-type work vehicle as a comparative example. FIG. 16C illustrates the output torque of the engine 21. The chain double-dashed line in FIG. 16C indicates the output torque of a conventional torque converter-type work vehicle as a comparative example. The solid line in FIG. 16D indicates the work implement pump pressure. The dashed line in FIG. 16D indicates the displacement volume of the work implement pump 23. That is, FIG. 16D illustrates the load on the work implement pump 23. The solid line in FIG. 16E indicates the boom operation amount. The dashed line in FIG. 16E indicates the bucket operation amount. A positive operation amount in FIG. 16E signifies an operation of raising the work implement 3, and a negative operation amount signifies an operation of lowering the work implement 3. The solid line in FIG. 16F indicates the accelerator operation amount. The accelerator operating amount is maximum except for a portion of the locations when the work aspect is being switched during the V-shaped work in the present exemplary embodiment. The dashed line in FIG. 16F indicates the command throttle value. FIG. 16G illustrates the speed ranges selected by the speed change operating member 53a. FIG. 16H illustrates the selection positions (FNR positions) of the FR operating member 54a.

As described above, the work vehicle moves forward to approach the pile 300 in the forward movement work aspect (1). As a result, an operation in which the load on the work implement 3 increases is not basically being conducted as illustrated in FIG. 16E, and the load on the work implement pump 23 is small as illustrated in FIG. 16D. Therefore, the horsepower of the engine 21 is mainly distributed to the power-transmission device 24.

As illustrated in FIG. 16A, the work vehicle 1 begins to move from a stopped state and then accelerates in the forward movement work aspect (1). As illustrated in FIG. 8, the transmission requirement determination unit 84 in the work vehicle 1 according to the present exemplary embodiment determines the required tractive force Tout on the basis of the output rotation speed Nout and the accelerator operating amount Aac, and determines the transmission required horsepower Htm by multiplying the output rotation speed Nout by the transmission required horsepower Htm. Therefore, the transmission required horsepower Htm is small because the vehicle speed when beginning to move is low. However, because the tractive force is generated even before the engine rotation speed increases, the acceleration when beginning to move is superior in comparison to the conventional torque converter-type vehicle as illustrated in FIG. 16(A). The energy required for acceleration can be additionally supplied from the electrical power of the capacitor 64.

Next when the vehicle speed rises and the transmission required horsepower Htm increases, the engine required horsepower Hdm increases. As a result, the command throttle value Th_cm increases as illustrated in FIG. 16F due to the matching point Pma1 illustrated in FIG. 13 moving along the matching line Lma. Consequently, the engine rotation speed increases as illustrated in FIG. 16B. However in the conventional torque converter-type work vehicle, the engine rotation speed rises due to the engine load growing smaller when there is no load on the work implement. As a result, the consumption amount of the fuel increases. Conversely in the work vehicle 1 of the present exemplary embodiment, the engine rotation speed is kept low because the command throttle value Th_cm is determined on the basis of the transmission required horsepower Htm. Accordingly, fuel consumption can be improved.

Next in the digging work aspect (2), the work vehicle 1 plunges into the pile 300 to load the load into the bucket. As illustrated in FIG. 16A, the vehicle speed is low in the digging work aspect. As a result, the output torque from the power-transmission device 24 is large and the required horsepower in the power-transmission device 24 is small. However, operation of the work implement 3 is conducted in the digging work aspect (2) as illustrated in FIG. 16E. As a result, the horsepower of the engine 21 is distributed to the work implement pump 23. Therefore, the distribution of the horsepower to the power-transmission device 24 and the work implement pump 23 is important in the digging work aspect (2) because there may be a shortage of digging power if the horsepower of the engine 21 is too small.

As illustrated in FIG. 16G, the operator shifts down the speed range down from the second speed to the first speed by first operating the speed change operating member 53a when starting the digging. When the speed range is shifted down to the first speed in the work vehicle 1 according to the present exemplary embodiment, the basic tractive force characteristics are changed from second speed characteristics to first speed characteristics. As a result, the required tractive force characteristics are changed from Lout2 to Lout2' as illustrated in FIG. 8 for example. In this case, the required tractive force Tout is determined to be a negative value when the vehicle speed (output rotation speed Nout) is greater than the upper limit in the first speed. As a result, braking force is generated.

When the bucket 12 plunges into the pile 300, the vehicle speed decreases. In this case, the transmission requirement determination unit 84 determines the required tractive force Tout and the transmission required horsepower Htm in response to the vehicle speed according to the required tractive force characteristics for the first speed.

During the digging, the operator conducts an operation to raise the boom 11. In this case, the work implement required horsepower Hpto illustrated in FIG. 11 increases and as a result the engine required horsepower Hdm illustrated in FIG. 12 increases. As a result, the command throttle value Th_cm increases due to the matching point Pma1 illustrated in FIG. 13 moving along the matching line Lma. Consequently, the engine rotation speed increases.

During digging, the operator may intermittently perform the operation of raising the bucket 12 as illustrated in FIG. 16E. In this case, the work implement required horsepower Hpto illustrated in FIG. 11 repeatedly increases and decreases and as a result the engine required horsepower Hdm illustrated in FIG. 12 repeatedly increases and decreases. The command throttle value Th_cm changes as illustrated in FIG. 16F due to the matching point Pma1 illustrated in FIG. 13 moving along the matching line Lma in response to the changes in the engine required horsepower Hdm, and as a result the engine rotation speed is adjusted as illustrated in FIG. 16B.

In the work aspect (3) of moving in reverse away from the pile 300, the work vehicle 1 moves in reverse to move away from the pile 300. As a result, an operation in which the load on the work implement 3 increases is basically hardly being conducted as illustrated in FIG. 16E, and the load on the work implement pump 23 is small as illustrated in FIG. 16D.

During reverse travel, the work vehicle 1 first accelerates in the same way as in the forward travel. As a result, the vehicle speed toward the rear increases. As illustrated in FIG. 16A, the acceleration of the work vehicle 1 according to the present exemplary embodiment when beginning to move is superior in comparison to the conventional torque converter-type vehicle even when beginning to move in reverse in the same way as when beginning to move forward.

The work vehicle 1 conducts the next deceleration when moving in reverse and moving away from the earth pile. During deceleration, the transmission required horsepower Htm decreases because the required tractive force Tout decreases. As a result, the command throttle value Th_cm decreases as illustrated in FIG. 16F due to the matching point Pma1 illustrated in FIG. 13 moving along the matching line Lma. Consequently, the engine rotation speed decreases as illustrated in FIG. 16B. During deceleration, the braking force may be required because the required tractive force Tout becomes a negative value. For example as illustrated in FIG. 16Q immediately after the FR operating member 54a during reverse movement of the work vehicle 1 is switched from the reverse movement position to the forward movement position, the FR operating member 54a is set to the forward movement position, but the braking force is required when the work vehicle 1 is moving in reverse. When the braking force is generated, kinetic energy absorbed as braking force is regenerated in the engine 21 or in the capacitor 64 through the power-transmission device 24. When energy is regenerated in the engine 21, fuel consumption can be improved. Moreover, when energy is regenerated in the capacitor 64, the timing for using the energy can be adjusted.

In the dump approach/dumping work aspect, the work vehicle 1 next moves forward and approaches the dump truck 200 and lowers the load from the bucket 12 onto the bed of the dump truck 200. The work vehicle 1 accelerates while carrying the load in the bucket 12 during the dump approach. At this time, the load on the work implement pump 23 is large due to the operation of raising the bucket 12 being conducted. When the vehicle speed is too fast in the dump approach/dumping work aspect, the work vehicle 1 may reach the dump truck 200 before the bucket 12 is sufficiently raised. As a result, the proper operability of the vehicle speed and the work implement 3 is important.

The load on the work implement pump 23 is large during the dump approach. As a result, the engine rotation speed is increased to handle the high load of the work pump in the conventional torque converter-type work vehicle. In this case, the absorption torque of the torque converter also increases and as a result the vehicle speed increases. As a result, there is a need to adjust the vehicle speed by using an operating member such as the brake, an inching pedal, or a cut-off pedal. Conversely, the work implement required horsepower Hpto is determined in response to the operation of the work implement operation detecting unit 52b in the work vehicle 1 according to the present exemplary embodiment. As a result, the necessary power can be supplied to the work implement pump 23 through the operation of the work implement operation detecting unit 52b. Moreover, the vehicle speed can be adjusted easily by operating the accelerator operating member 51a because the target output torque To_ref is determined on the basis of the accelerator operating amount Aac. As a result, the vehicle speed can be adjusted easily and the work implement 3 can be operated easily without complicated driving operations.

The engine output of the work vehicle 1 according to the present exemplary embodiment is adjusted on the basis of horsepower. As a result, the engine can be controlled in a high engine efficiency region with low rotation and high torque. As illustrated in FIG. 10, the target-input-torque determination unit 81 determines the target input torque Te_ref so as not to exceed the predetermined upper limit target input torque Max_Te. Therefore, the target input torque Te_ref is determined so that excess torque for increasing the engine rotation speed remains. As a result, a reduction in engine rotation speed can be suppressed even if the load on the engine 21 is large.

During dumping, the operator completes the raising of the boom 11 and lowers the bucket 12 while reducing the accelerator operating amount. Therefore, the required tractive force Tpto is reduced and the transmission required horsepower Htm is reduced in accordance with a reduction in the accelerator operating amount. The work implement required horsepower Hpto is reduced due to the completion of the raising of the boom 11. As a result, the command throttle value Th_cm decreases as illustrated in FIG. 16F due to the matching point Pma1 illustrated in FIG. 13 moving along the matching line Lma. Consequently, the engine rotation speed decreases as illustrated in FIG. 16B.

The controls for the work aspect (5) of moving in reverse and moving away from the dump truck 200 are the same as those of work aspect (3) for moving in reverse and moving away from the pile 300, and an explanation thereof will be omitted.

The work vehicle 1 according to the present exemplary embodiment has the following features. The control unit 27 is able to achieve the desired input torque for the power-transmission device 24 and the desired output torque from the power-transmission device 24 by determining the command torques Tm1_ref and Tm1_ref to the motors MG1 and MG2 from the balance of the torques of the power-transmission device 24. As a result, predetermined tractive force characteristics can be achieved accurately. Generally, a work vehicle is required to conduct work while the tractive force and the loads on the work implement fluctuate greatly. Therefore, the ability to adjust the input torque and the output torque to the power-transmission device to desired values is desirable in order to achieve a balance between the driving power and the operation of the work implement. By adjusting the target input torque Te_ref and the target output torque To_ref in the work vehicle 1 according to the present exemplary embodiment, the desired input torque to the power-transmission device 24 and the desired output torque from the power-transmission device 24 can be achieved. As a result, a work vehicle combining both operability and drivability can be realized.

The transmission requirement determination unit 84 determines the required tractive force Tout on the basis of the accelerator operating amount Aac and the output rotation speed Nout. Therefore, the required tractive force Tout is determined on the basis of the accelerator operating amount Aac in addition to the output rotation speed Nout. The target output torque To_ref is determined on the basis of the accelerator operating amount Aac because the target-output-torque determination unit 82 determines the target output torque To_ref on the basis of the required tractive force Tout. As a result, the operational feeling of the operator can be improved.

The transmission requirement determination unit 84 determines the required tractive force Tout from the output rotation speed Nout on the basis of the required tractive force characteristics information D1. The transmission requirement determination unit 84 determines the required tractive force characteristics information D1 on the basis of the accelerator operating amount Aac. As a result, the required tractive force Tout can be determined on the basis of the accelerator operating amount Aac by determining the required tractive force characteristics information D1 in response to the accelerator operating amount Aac.

The transmission requirement determination unit 84 determines the current required tractive force characteristics Lout2 by multiplying the basic tractive force characteristics Lout1 by the tractive force ratio FWR and the vehicle speed ratio VR. The transmission requirement determination unit 84 determines the tractive force ratio FWR and the vehicle speed ratio VR in response to the accelerator operating amount Aac. As a result, the required tractive force characteristics Lout2 can be determined in response to the accelerator operating amount Aac by using the tractive force ratio FWR and the vehicle speed ratio VR in response to the accelerator operating amount Aac.

The required tractive force characteristics information D1 defines the required tractive force Tout as a negative value with respect to the output rotation speed Nout that is no less than the predetermined speed. As a result, the required tractive force Tout becomes a negative value when the output rotation speed Nout is not less than the predetermined speed. That is, when the output rotation speed Nout is high, the power-transmission device 24 is controlled so as to generate a braking force. For example, when the required tractive force characteristics change from Lout2 to Lout2' in a state corresponding to the point P on the required tractive force characteristics in FIG. 8, the required tractive force Tout is changed from a positive value to a negative value. As a result, braking force is generated. Therefore, a behavior similar to engine brake generated due to down-shifting occurring in a torque converter-type speed change device is materialized in the EMT-type power-transmission device 24.

The target-input-torque determination unit 81 determines the target input torque Te_ref on the basis of the transmission required horsepower Htm and the energy management required horsepower Hem. As a result, the target input torque Te_ref for the power-transmission device 24 can be determined so that a horsepower required for outputting a tractive force corresponding to the required tractive force from the power-transmission device 24, and a required horsepower for storing electrical power in the capacitor 64 are achieved.

The target-input-torque determination unit 81 determines the upper limit of the target input torque Te_ref from the upper limit target input torque line Lmax_Te+Tpto and the engine rotation speed Ne. As a result, a value less than the target output torque of the engine 21 determined from the engine required horsepower Hdm and the engine rotation speed Ne becomes the upper limit of the target input torque Te_ref. Therefore, the target input torque Te_ref is determined so that excess torque for increasing the engine rotation speed Ne remains. As a result, a decrease in the engine rotation speed Ne due to overloading can be suppressed.

The distribution ratio determination unit 88 sets a value less than one as the transmission output ratio Rtm when the total of the work implement required horsepower Hpto, the transmission required horsepower Htm, and the energy management required horsepower Hem is larger than the predetermined load upper limit horsepower Hmax. As a result, while the value of the transmission required horsepower Htm is reduced when determining the target input torque Te_ref when the total of the work implement required horsepower Hpto, the transmission required horsepower Htm, and the energy management required horsepower Hem is larger than the predetermined load upper limit horsepower Hmax, the value of the energy management required horsepower Hem is maintained. That is, the energy management required horsepower Hem is prioritized more than the transmission required horsepower Htm when determining the target input torque Te_ref. Consequently, the energy management required horsepower Hem is prioritized and the output horsepower from the engine 21 can be distributed, and as a result predetermined electrical power can be ensured in the capacitor 64.

The matching line Lma is set to pass through a position closer to the maximum torque point Pm than the rated point Pr in the full load region Lb of the engine torque line Let. As a result, the engine rotation speed Ne at the matching point Pma1 is smaller in comparison to when the matching line Lma is set to pass through a position closer to the rated point Pr than the maximum torque point Pm in the full load region Lb of the engine torque line Let. As a result, the fuel consumption can be improved.

The engine requirement determination unit 87 determines the engine required horsepower Hdm on the basis of the work implement required horsepower Hpto, the transmission required horsepower Htm, and the energy management required horsepower Hem. As a result, the engine required horsepower Hdm can be determined which is suited to the driving of the work implement 3 and the driving of the travel device 25 corresponding to the operations of the operator and is suited to charging the capacitor 64.

Figure 17:
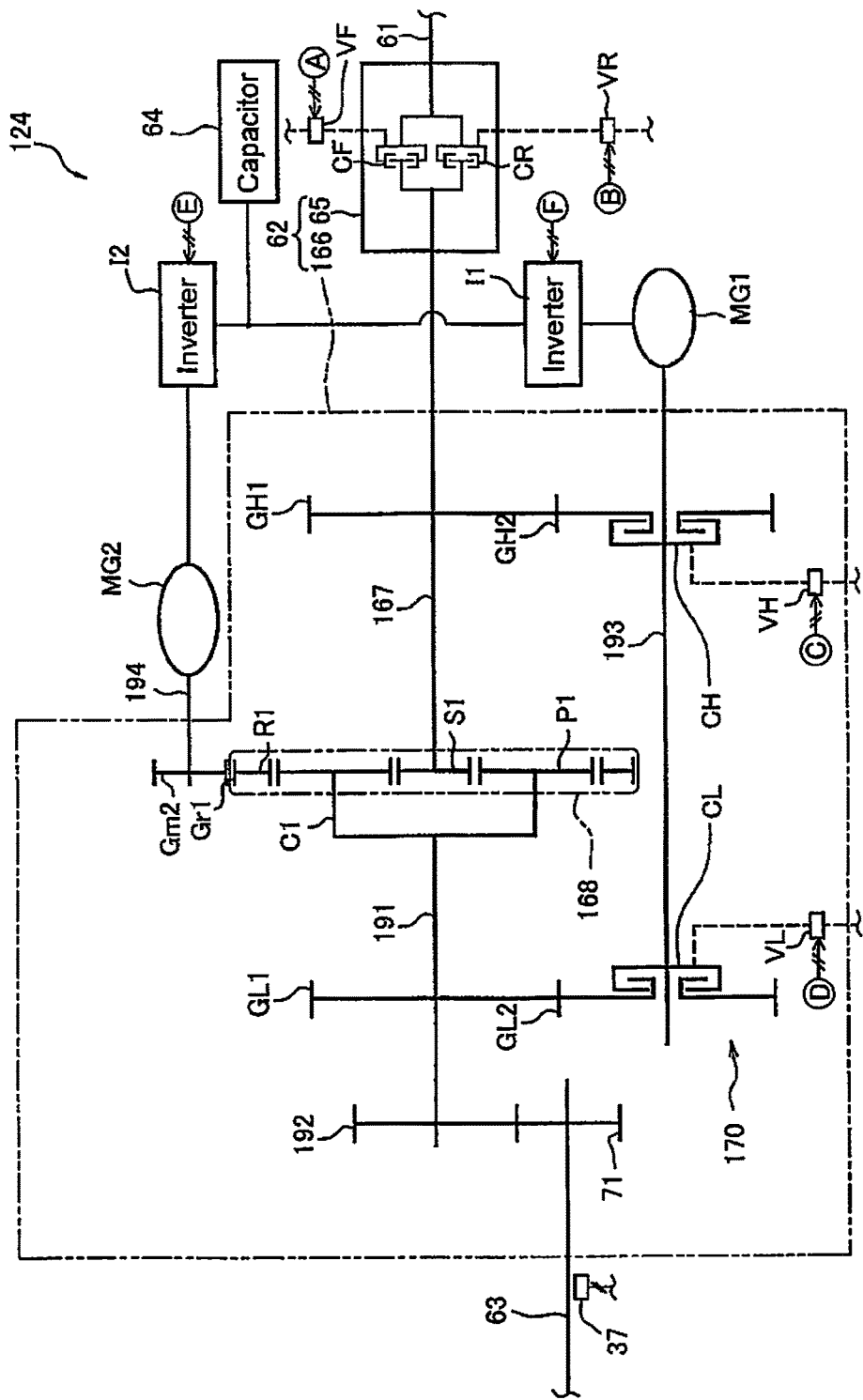
FIG. 17 is a schematic view of a configuration of a power-transmission device according to another exemplary embodiment.

The above mentioned power-transmission device 24 has the first planetary gear mechanism 68 and the second planetary gear mechanism 69. However, the number of the planetary gear mechanisms provided in the power-transmission device is not limited to two. The power-transmission device 24 may only have one planetary gear mechanism. Alternatively, the power-transmission device may have three or more planetary gear mechanisms. FIG. 17 is a schematic view of a configuration of a power-transmission device 124 provided in a work vehicle according to a second exemplary embodiment. Other configurations of the work vehicle according to the second exemplary embodiment are the same as those of the work vehicle 1 according to the above exemplary embodiment and thus explanations thereof are omitted. The same reference numerals are provided in FIG. 17 for the configurations which are the same as the power-transmission device 24 according to the above exemplary embodiment.

As illustrated in FIG. 17, the power-transmission device 124 has a speed change mechanism 166. The speed change mechanism 166 has a planetary gear mechanism 168, a first transmission shaft 167, a second transmission shaft 191, and a second transmission shaft gear 192. The first transmission shaft 167 is coupled to the FR switch mechanism 65. The planetary gear mechanism 168 and the second transmission shaft gear 192 are disposed on the same shaft as the first transmission shaft 167 and the second transmission shaft 191.

The planetary gear mechanism 168 has a sun gear S1, a plurality of planet gears P1, a carrier C1 that supports the plurality of planet gears P1, and a ring gear R1. The sun gear S1 is coupled to the first transmission shaft 67. The plurality of planet gears P1 mesh with the sun gear S1 and are supported in a rotatable manner by the carrier C1. The carrier C1 is fixed to the second transmission shaft 191. The ring gear I11 meshes with the plurality of planet gears P1 and is able to rotate. A ring outer periphery gear Gr1 is provided on the outer periphery of the ring gear R1. The second motor gear Gm2 is fixed to the output shaft 194 of the second motor MG2 and the second motor gear Gm2 meshes with the ring outer periphery gear Gr1.

The second transmission shaft gear 192 is coupled to the second transmission shaft 191. The second transmission shaft gear 192 meshes with the output gear 71, and the rotation of the second transmission shaft gear 192 is outputted to the output shaft 63 via the output gear 71.

The speed change mechanism 166 has a first high-speed gear (referred to below as "first H-gear GH1"), a second high-speed gear (referred to below as "second H-gear GH2"), a first low-speed gear (referred to below as "first L-gear GL1"), a second low-speed gear (referred to below as "second L-gear GL2"), a third transmission shaft 193, and a Hi/Lo switching mechanism 170.

The first H-gear GH1 and the first L-gear GL1 are disposed on the same shaft as the first transmission shaft 167 and the second transmission shaft 191. The first H-gear GM is coupled to the first transmission shaft 67. The first L-gear GL1 is coupled to the second transmission shaft 191. The second H-gear GH2 meshes with the first H-gear GH1. The second L-gear GL2 meshes with the first L-gear GL1. The second H-gear GH2 and the second L-gear GL2 are disposed on the same shaft as the third transmission shaft 193, and are disposed so as to be able to rotate in relation to the third transmission shaft 193. The third transmission shaft 193 is coupled to the output shaft of the first motor MG1.

The Hi/Lo switch mechanism 170 is a mechanism for switching the drive-power transmission path of the power-transmission device 124 between a high-speed mode (Hi mode) in which the vehicle speed is high and a low-speed mode (Lo mode) in which the vehicle speed is low. The Hi/Lo switch mechanism 170 has a H-clutch CH that is ON during the Hi mode and an L-clutch CL that is ON during the Lo mode. The H-clutch CH connects and disconnects the second H-gear GH2 and the third transmission shaft 193. The L-clutch CL connects and disconnects the second L-gear GL2 and the third transmission shaft 193.

Figure 18:
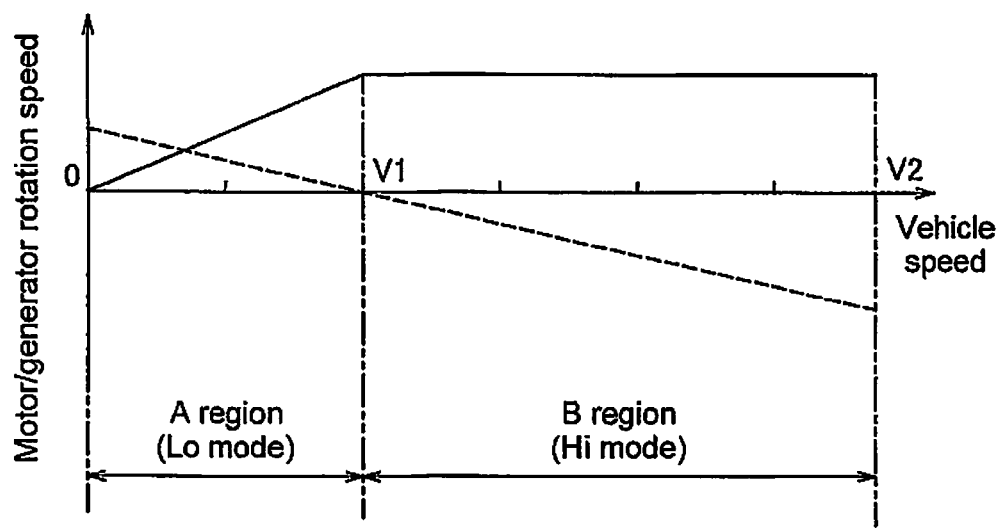
FIG. 18 illustrates changes in the rotation speeds of the first motor and the second motor with respect to the vehicle speed in the power-transmission device according to still another exemplary embodiment.

Next the operations of the power-transmission device 124 according to a second exemplary embodiment will be explained. FIG. 18 illustrates the rotation speeds of each of the motors MG1 and MG2 with respect to the vehicle speed of the work vehicle according to the second exemplary embodiment. In FIG. 18, the solid line represents the rotation speed of the first motor MG1, and the dashed line represents the rotation speed of the second motor MG2. In an A region (Lo mode) with a vehicle speed from zero to V1, the L-clutch CL is ON (connected) and the H-clutch CH is OFF (disconnected). Because the H-clutch CH is OFF in the A region, the second H-gear GH2 and the third transmission shaft 193 are disconnected. Because the L-clutch CL is ON, the second L-gear GL2 and the third transmission shaft 193 are connected.

In the A region, the driving power from the engine 21 is inputted to the sun gear S1 via the first transmission shaft 167, and the driving power is outputted from the carrier C1 to the second transmission shaft 191. Conversely, the driving power inputted to the sun gear S1 is transmitted from the planet gear P1 to the ring gear R1 and outputted through the ring outer periphery gear Gr1 and the second motor gear Gm2 to the second motor MG2. The second motor MG2 functions mainly as a generator in the A region, and a portion of the electrical power generated by the second motor MG2 is stored in the capacitor 64.

The first motor MG1 functions mainly as an electric motor in the A region. The driving power of the first motor MG1 is outputted to the second transmission shaft 191 along a path from the third transmission shaft 193 to the second L-gear GL2 to the first L-gear GL1. The driving power joined by the second transmission shaft 191 in this way is transmitted through the second transmission shaft gear 192 and the output gear 71 to the output shaft 63.

In a B region (Hi mode) in which the vehicle speed exceeds V1, the H-clutch CH is ON (connected) and the L-clutch CL is OFF (disconnected). Because the H-clutch CH is ON in the B region, the second H-gear GH2 and the third transmission shaft 193 are connected. Because the L-clutch CL is OFF, the second L-gear GL2 and the third transmission shaft 193 are disconnected.

In the B region, the driving power from the engine 21 is inputted to the sun gear S1 and the driving power is outputted from the carrier C1 to the second transmission shaft 191. The driving power from the engine 21 is outputted from the first H-gear GH1 through the second H-gear GH2 and the third transmission shaft 193 to the first motor MG1. The first motor MG1 functions mainly as a generator in the B region, and thus a portion of the electrical power generated by the first motor MG1 is stored in the capacitor 64.

The driving power of the second motor MG2 is outputted to the second transmission shaft 191 along a path from the second motor gear Gm2 to the ring outer periphery gear Gr1 to the ring gear R1 to the carrier C1. The driving power joined by the second transmission shaft 191 in this way is transmitted through the second transmission shaft gear 192 and the output gear 71 to the output shaft 63.

The control of the power-transmission device 124 in the work vehicle according to the second exemplary embodiment is the same as the control of the power-transmission device 24 in the above exemplary embodiment. However, the structure of the power-transmission device 124 is different from that of the power-transmission device 24, and the torque-balance information is different from the above information. Specifically, a first torque-balance information in the second exemplary embodiment is represented by the following equation 6.

$$Ts1\_Low = Te\_ref * r\_fr$$

$$Tc1\_Low = Ts1\_Low * (-1) * ((Zr1/Zs1) + 1)$$

$$Tr1\_Low = Ts1\_Low * (Zr1/Zs1)$$

$$Tcm1\_Low = To\_ref * (-1) * (Zod/Zo) + Tc1\_Low$$

$$Tm1\_Low = Tcm1\_Low * (-1) * (Zm1\_Low/Zm1d\_Low)$$

$$Tm2\_Low = Tr1\_Low * (-1) * (Zm2/Zm2d) \quad \text{(Equation 6)}$$

A second torque-balance information in the second exemplary embodiment is represented by the following equation 7.

$$Tc1\_Hi = To\_ref * (-1) * (Zod/Zo)$$

$$Tr1\_Hi = Tc1\_Hi * (-1) * (1/(Zs/Zr + 1))$$

$$Ts1\_Hi = Tr1\_Hi * (Zs/Zr)$$

$$Tsm1\_Hi = Ts1 + Te\_ref * r\_fr$$

$$Tm1\_Hi = Tsm1\_Hi * (-1) * (Zm1\_Hi/Zm1d\_Hi)$$

$$Tm2\_Hi = Tr1\_Hi * (-1) * (Zm2/Zm2d) \quad \text{(Equation 7)}$$

The contents of the parameters in each of the types of torque-balance information are depicted in Table 2 below.

TABLE 2

| | |
|---|---|
| Te_ref | Target input torque |
| To_ref | Target output torque |
| r_fr | Deceleration ratio for the FR switch mechanism 65 (The FR switch mechanism 65 outputs the engine rotation speed to decelerate to 1/r_fr. When the FR switch mechanism 65 is in the forward movement state, r_fr is a negative value. When the FR switch mechanism 65 is in the reverse movement state, r_fr is a positive value.) |
| Zs1 | Number of teeth of the sun gear S1 in the planetary gear mechanism 168. |
| Zr1 | Number of teeth of the ring gear R1 in the planetary gear mechanism 168. |
| Zm1d_Hi | Number of teeth of the first H-gear GH1 |
| Zm1d_Low | Number of teeth of the first L-gear GL1 |
| Zm1_Hi | Number of teeth of the second H-gear GH2 |
| Zm1_Low | Number of teeth of the second L-gear GL2 |
| Zm2 | Number of teeth of the ring outer periphery gear Gr1 |
| Zm2d | Number of teeth of the second motor gear Gm2 |
| Zo | Number of teeth of the second transmission shaft gear 192 |
| Zod | Number of teeth of the output gear 71 |

The present invention is not limited to the above exemplary embodiments and various changes and modifications may be made without departing from the spirit of the invention.

The present invention is not limited to the above mentioned wheel loader and may be applied to another type of work vehicle such as a bulldozer, a tractor, a forklift, or a motor grader.

The present invention may be applicable to another type of speed change device such as the HMT without being limited to the EMT. In this case, the first motor MG1 functions as a hydraulic motor and a hydraulic pump. The second motor MG2 functions as a hydraulic motor and a hydraulic pump. The first motor MG1 and the second motor MG2 are variable capacitor pump/motors, and the capacities are controlled by the control unit 27 controlling the tilt angle of the skew plate or the inclined shaft. The capacities of the first motor MG1 and the second motor MG2 are controlled so that the command torques Tm1_ref and Tm2_ref calculated in the same way as in the above exemplary embodiments are outputted.

The configuration of the power-transmission device 124 is not limited to the configuration of the above exemplary embodiment. For example, the coupling and disposition of each of the elements of the two planetary gear mechanisms 68 and 69 are not limited to the coupling and disposition of the above exemplary embodiments. The configuration of the power-transmission device 124 is not limited to the configuration of the above exemplary embodiment. For example, the coupling and disposition of each of the elements of the planetary gear mechanism 168 are not limited to the coupling and disposition of the above exemplary embodiment.

The torque-balance information is not limited to the equations for balancing the torque as in the above exemplary embodiments. For example, the torque-balance information may be in the format of a table or a map. The torque-balance information is not limited to the above mentioned two types of torque-balance information of the first torque-balance information and the second torque-balance information. Three or more types of torque-balance information may be used corresponding to a selectable number of modes when the drive-power transmission path of the power-transmission device 124 has three or more modes. Alternatively, only one torque-balance information may be used when the drive-power transmission path for the power-transmission device 124 has only one mode.

The speed change operating member 53a may have a kick-down switch. A kick-down switch is an operating member for lowering the speed range of the power-transmission device 124 by one step or a plurality of steps from the current speed range. The operator is able to lower the speed range of the power-transmission device 124 from the current speed range to a low-speed speed range by operating the kick-down switch.

The determination of the work implement required horsepower Hpto and the work implement load torque Tpto in the above embodiments takes into consideration the required horsepower and the load torque of the work implement pump 23 for the work implement 3, but may also take into consideration the required horsepower and the load torque of a hydraulic pump for auxiliary equipment. The hydraulic pump for auxiliary equipment may include the above mentioned transmission pump 29. That is, the work implement required horsepower Hpto and the work implement load torque Tpto may be determined while considering the required horsepower and the load torque of the above mentioned transmission pump 29 in addition to those of the work implement pump 23.

Alternatively, the hydraulic pump of the auxiliary equipment may include the above mentioned steering pump 30. That is, the work implement required horsepower Hpto and the work implement load torque Tpto may be determined while considering the required horsepower and the load torque of the above mentioned steering pump 30 in addition to those of the work implement pump 23.

Alternatively, when the work vehicle 1 is provided with a cooling fan for cooling the engine 21, a fan motor for driving the cooling fan, and a fan pump for driving the fan motor, the hydraulic pump for auxiliary equipment may be the fan pump. That is, the work implement required horsepower Hpto and the work implement load torque Tpto may be determined while additionally considering the required horsepower and the load torque of the fan pump.

Alternatively, the work implement required horsepower Hpto and the work implement load torque Tpto may be determined while considering a portion or all the required horsepower and the load torque of the above mentioned hydraulic pumps in addition to those of the work implement pump 23.

The priority levels for the distribution of the output horsepower from the engine 21 by the distribution ratio determination unit 88 are not limited to the levels of the above exemplary embodiments and may be modified. While the priority level of the ratio portion Htm_B of the transmission required horsepower Htm is lower than the priority level of the ratio portion Hpto_B of the work implement required horsepower Hpto in the above exemplary embodiments, the priority levels of the ratio portion Htm_B of the transmission required horsepower Htm and the ratio portion Hpto_B of the work implement required horsepower Hpto may be the same.

Figure 19:
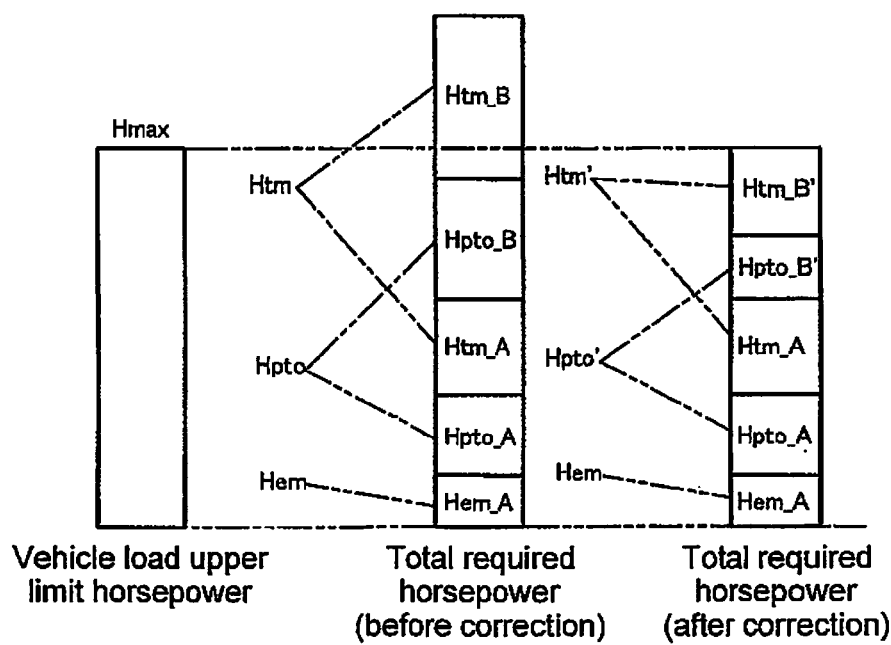
FIG. 19 illustrates a method for distributing output horsepower from an engine according to yet another exemplary embodiment.

For example as illustrated in FIG. 19, when the sum of the work implement required horsepower Hpto, the transmission required horsepower Htm, and the energy management required horsepower Hem is greater than the predetermined load upper limit horsepower Hmax, the ratio portion Htm_B of the transmission required horsepower Htm and the ratio portion Hpto_B of the work implement required horsepower Hpto may be multiplied by the same ratio $\alpha$ (<1) so that the sum becomes equal to or less than the load upper limit horsepower Hmax whereby the ratio portion Htm_B and the ratio portion Hpto_B are corrected respectively to Htm_B' and Hpto_B'. That is, Htm_B'=Htm_B*$\alpha$ and Hpto_B'=Hpto_B*$\alpha$. The ratio of the corrected transmission required horsepower Htm' with respect to the uncorrected transmission required horsepower Htm is determined as the transmission output ratio Rtm. The ratio of the corrected work implement required horsepower Hpto' with respect to the uncorrected work implement required horsepower Hpto is determined as the work implement output ratio Rpto.

According to the present invention, an engine output suited to driving the work implement and driving the travel device can be achieved in a hybrid work vehicle.

What is claimed is:

1. A work vehicle, comprising:
   an engine;
   a hydraulic pump driven by the engine;
   a work implement driven by hydraulic fluid discharged from the hydraulic pump;
   a work implement operating member for operating the work implement;
   a pressure sensor for detecting a hydraulic pressure of the hydraulic pump;
   a travel device driven by the engine;
   a power-transmission device configured to transmit driving power from the engine to the travel device;
   a vehicle speed detecting unit for detecting a vehicle speed;
   an accelerator operating member;
   an accelerator operation detecting unit for detecting an operation amount of the accelerator operating member; and
   a control unit configured to control the power-transmission device;
   the power-transmission device including
       an input shaft;
       an output shaft;
       a gear mechanism including a planetary gear mechanism, the gear mechanism being configured to transmit rotation of the input shaft to the output shaft;
       a motor connected to a rotating element of the planetary gear mechanism; and
       an energy reservoir unit for storing energy generated in the motor; and
       the power-transmission device configured so that a rotation speed ratio of the output shaft with respect to the input shaft is changed by changing the rotation speed of the motor, and
   the control unit including
       a work implement requirement determination unit for determining a work implement required horsepower on the basis of the operation amount of the work implement operating member and the hydraulic pressure of the hydraulic pump;
       a transmission requirement determination unit for determining a transmission required horsepower on the basis of the vehicle speed and the operation amount of the accelerator operating member;
       an engine requirement determination unit for determining an engine required horsepower on the basis of the work implement required horsepower and the transmission required horsepower;
       a required throttle determination unit for determining a required throttle value based on the engine required horsepower;
       an energy management requirement determination unit for determining an energy management required horsepower on the basis of a remaining amount of energy in the energy reservoir unit;
       a distribution ratio determination unit for determining a transmission output ratio, dividing the work implement required horsepower and the transmission required horsepower into respective priority portions and respective ratio portions, prioritizing the priority portions of the work implement required horsepower and the transmission required horsepower over the ratio portions of the work implement required horsepower and the transmission required horsepower, and maintaining the priority portions of the work implement required horsepower and the transmission required horsepower and decreasing the ratio portions of the work implement required horsepower and the transmission required horsepower when the sum of the work implement required horsepower, the transmission required horsepower and the energy management required horsepower is greater than a predetermined load upper limit horsepower; and
       the distribution ratio determination unit prioritizing the energy management required horsepower over the priority portions of the work implement required horsepower and the transmission required horsepower.

2. The work vehicle according to claim 1, wherein
the control unit further includes
- a target-input-torque determination unit that determines a target input torque which is a torque target value inputted to the power-transmission device;
- a target-output-torque determination unit that determines a target output torque which is a torque target value outputted from the power-transmission device;
- a storage unit that stores torque-balance information to define a relationship between the target input torque and the target output torque so that a balance of the torques in the power-transmission device is achieved; and
- a command-torque determination unit that uses the torque-balance information to determine a command torque for the motor from the target input torque and the target output torque.

3. The work vehicle according to claim 2, wherein
the transmission requirement determination unit determines a required tractive force on the basis of the vehicle speed and the operation amount of the accelerator operating member; and
the target-output-torque determination unit determines the target output torque on the basis of the required tractive force.

4. The work vehicle according to claim 3, wherein
the transmission requirement determination unit determines the required tractive force from the vehicle speed on the basis of required tractive force characteristics that define a relationship between the vehicle speed and the required tractive force; and
the transmission requirement determination unit determines the required tractive force characteristics in response to an operation amount of the accelerator operating member.

5. The work vehicle according to claim 4, wherein
the transmission requirement determination unit determines the required tractive force characteristics by multiplying basic required tractive force characteristics by a tractive force ratio and a vehicle speed ratio; and
the transmission requirement determination unit determines the tractive force ratio and the vehicle speed ratio in response to an operation amount of the accelerator operating member.

6. The work vehicle according to claim 5, further comprising
a speed change operating member;
the transmission requirement determination unit selecting the basic required tractive force characteristics in response to an operation of the accelerator operating member.

7. The work vehicle according to claim 3, wherein
the tractive force characteristics define the required tractive force as a negative value with respect to the vehicle speed equal to or above a predetermined speed.

8. The work vehicle according to claim 2, wherein
the target-input-torque determination unit determines the target input torque on the basis of the transmission required horsepower and the energy management required horsepower.

9. The work vehicle according to claim 8, wherein
the engine requirement determination unit determines the engine required horsepower on the basis of the work implement required horsepower, the transmission required horsepower, and the energy management required horsepower;
the target-input-torque determination unit determines an upper limit of the target input torque from an upper limit target input torque line and the engine rotation speed; and
the upper limit target input torque line defines a value smaller than the target output torque of the engine determined from the engine required horsepower and the engine rotation speed, as the upper limit of the target input torque.

10. The work vehicle according to claim 9, wherein
when the sum of the work implement required horsepower, the transmission required horsepower, and the energy management required horsepower is greater than the predetermined load upper limit horsepower, the distribution ratio determination unit sets a value that is less than one as the transmission output ratio, and
the target-input-torque determination unit determines the target input torque on the basis of the energy management required horsepower and a value derived by multiplying the transmission required horsepower by the transmission output ratio.

11. The work vehicle according to claim 10, wherein
the target-output-torque determination unit determines the target output torque on the basis of a value derived by multiplying the required tractive force by the transmission output ratio.

12. The work vehicle according to claim 1, wherein
the storage unit stores an engine torque line that defines a relationship between the output torque of the engine and the engine rotation speed, and a matching line for determining the required throttle value from the engine required horsepower;
the engine torque line includes a regulation region and a full load region;
the regulation region changes in response to the required throttle value;
the full load region includes a rated point and a maximum torque point located on the low engine rotation speed side from the rated point;
the required throttle determination unit determines the required throttle value so that the engine torque line and the matching line coincide at a matching point where the output torque of the engine becomes a torque that corresponds to the engine required horsepower; and
the matching line is set to pass through a position closer to the maximum torque point than the rated point in the full load region of the engine torque line.

13. The work vehicle according to claim 12, wherein
the engine requirement determination unit determines the engine required horsepower on the basis of the work implement required horsepower, the transmission required horsepower, and the energy management required horsepower.

14. The work vehicle according to claim 2, wherein
the power-transmission device further has a mode-switching mechanism for selectively switching a drive-power transmission path for the power-transmission device between a plurality of modes that includes a first mode and a second mode; and
the command-torque determination unit determines the command torque for the motor from a first torque-balance information in the first mode, and determines the command torque for the motor from a second torque-balance information in the second mode.

15. A method for controlling a work vehicle, the work vehicle comprising:

a power-transmission device having an input shaft, an output shaft, a gear mechanism including a planetary gear mechanism, the gear mechanism being configured to transmit rotation of the input shaft to the output shaft, a motor connected to a rotating element of the planetary gear mechanism, and an energy reservoir unit for storing energy generated in the motor, the power-transmission device configured to change a rotation speed ratio of the output shaft with respect to the input shaft by changing the rotation speed of the motor;

the method comprising:

- a step for detecting an operation amount of a work implement operating member;
- a step for detecting a hydraulic pressure of a hydraulic pump for driving the work implement;
- a step for detecting a vehicle speed;
- a step for detecting an operation amount of an accelerator operating member;
- a step for determining a work implement required horsepower on the basis of an operation amount of the work implement operating member and the hydraulic pressure;
- a step for determining a transmission required horsepower on the basis of the vehicle speed and the operation amount of the accelerator operating member;
- a step for determining an engine required horsepower on the basis of the work implement required horsepower and the transmission required horsepower;
- a step for determining a required throttle value based on the engine required horsepower;
- a step for determining an energy management required horsepower on the basis of a remaining amount of energy in the energy reservoir unit;
- a step for dividing the work implement required horsepower and the transmission required horsepower into respective priority portions and respective ratio portions;
- a step for prioritizing the energy management required horsepower over the priority portions of the work implement required horsepower and the transmission required horsepower;
- a step for prioritizing the priority portions of the work implement required horsepower and the transmission required horsepower over the ratio portions of the work implement required horsepower and the transmission required horsepower; and
- a step for maintaining the priority portions of the work implement required horsepower and the transmission required horsepower and decreasing the ratio portions of the work implement required horsepower and the transmission required horsepower when the sum of the work implement required horsepower, the transmission required horsepower and the energy management required horsepower is greater than a predetermined load upper limit horsepower.

\* \* \* \* \*